(12) United States Patent
Garland

(10) Patent No.: US 7,367,624 B2
(45) Date of Patent: *May 6, 2008

(54) POWERED REMOTE RELEASE ACTUATOR FOR A SEAT ASSEMBLY

(75) Inventor: Nathan L Garland, Madison Heights, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/639,862

(22) Filed: Dec. 15, 2006

(65) Prior Publication Data

US 2007/0090670 A1  Apr. 26, 2007

Related U.S. Application Data

(63) Continuation of application No. 10/874,155, filed on Jun. 22, 2004, now Pat. No. 7,152,922.

(60) Provisional application No. 60/569,509, filed on May 7, 2004.

(51) Int. Cl.
*B60N 2/02* (2006.01)
*B60N 2/22* (2006.01)

(52) U.S. Cl. .................. 297/362.11; 297/378.1; 297/330; 297/378.13; 297/344.17; 296/65.01; 296/65.09

(58) Field of Classification Search .............. None
See application file for complete search history.

(56) References Cited

U.S. PATENT DOCUMENTS

| | | | |
|---|---|---|---|
| 2,983,545 | A | 5/1961 | Garvey et al. |
| 3,880,464 | A | 4/1975 | Murphy et al. |
| 4,434,468 | A | 2/1984 | Caddick et al. |
| 4,467,252 | A | 8/1984 | Takeda et al. |
| 4,484,776 | A | 11/1984 | Gokimoto et al. |
| 4,606,577 | A | 8/1986 | Hirama et al. |
| 4,627,656 | A | 12/1986 | Gokimoto et al. |
| 4,813,721 | A | 3/1989 | Mora |
| 5,004,967 | A | 4/1991 | Ogasawara |
| 5,348,373 | A | 9/1994 | Stiennon |
| 5,393,116 | A | 2/1995 | Bolsworth et al. |
| 5,435,624 | A | 7/1995 | Bray et al. |
| 5,536,069 | A | 7/1996 | Bray et al. |
| 5,662,368 | A | 9/1997 | Ito et al. |
| 5,717,300 | A | 2/1998 | Baloche et al. |
| 5,751,129 | A | 5/1998 | Vergin |
| 5,941,591 | A | 8/1999 | Tsuge et al. |

(Continued)

FOREIGN PATENT DOCUMENTS

DE  40 34 561 A1  5/1992

*Primary Examiner*—Lincoln Donovan
*Assistant Examiner*—Eduardo Colon
(74) *Attorney, Agent, or Firm*—Harness, Dickey & Pierce, P.L.C.

(57) ABSTRACT

A mechanism for a vehicle seat is includes a seat bottom supported by the vehicle and a seatback coupled to the seat bottom. The mechanism includes a first adjustment mechanism connected to the vehicle seat and operable between a locked position and an unlocked position and a first powered remote activation device coupled to the first adjustment mechanism. The first powered remote actuation device includes a motor and a transmission element operable to toggle the first adjustment mechanism into the unlocked position.

30 Claims, 16 Drawing Sheets

U.S. PATENT DOCUMENTS

| | | |
|---|---|---|
| 6,079,763 A | 6/2000 | Clemente |
| 6,123,380 A | 9/2000 | Sturt et al. |
| 6,131,999 A | 10/2000 | Piekny et al. |
| 6,135,555 A | 10/2000 | Liu et al. |
| 6,139,104 A | 10/2000 | Brewer |
| 6,158,800 A | 12/2000 | Tsuge et al. |
| 6,174,017 B1 | 1/2001 | Salani et al. |
| 6,270,141 B2 | 8/2001 | Moon et al. |
| 6,290,297 B1 | 9/2001 | Yu |
| 6,300,732 B1 | 10/2001 | Brambilla |
| 6,345,867 B1 | 2/2002 | Hellrung et al. |
| 6,361,098 B1 | 3/2002 | Pesta et al. |
| 6,478,358 B1 | 11/2002 | Okazaki et al. |
| 6,523,899 B1 | 2/2003 | Tame |
| 6,644,730 B2 | 11/2003 | Sugiura et al. |
| 6,677,720 B2 | 1/2004 | Fraser |
| 6,698,837 B2 | 3/2004 | Pejathaya et al. |
| 6,794,841 B1 | 9/2004 | Vang et al. |
| 6,857,703 B2 | 2/2005 | Bonk |
| 6,860,562 B2 | 3/2005 | Bonk |
| 6,910,739 B2 | 6/2005 | Grable et al. |
| 6,923,504 B1 | 8/2005 | Liu et al. |
| 2005/0006939 A1 | 1/2005 | Hancock et al. |

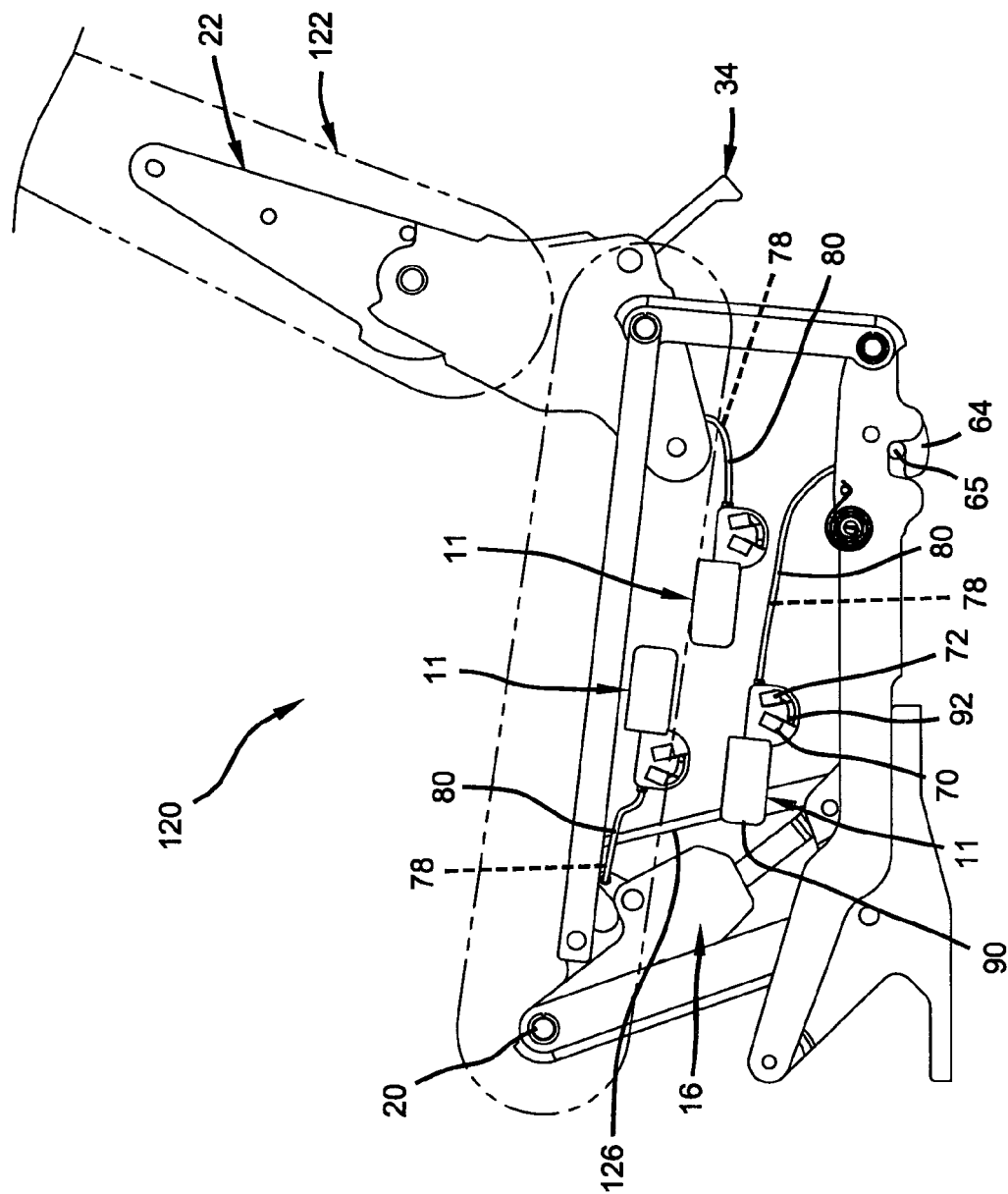

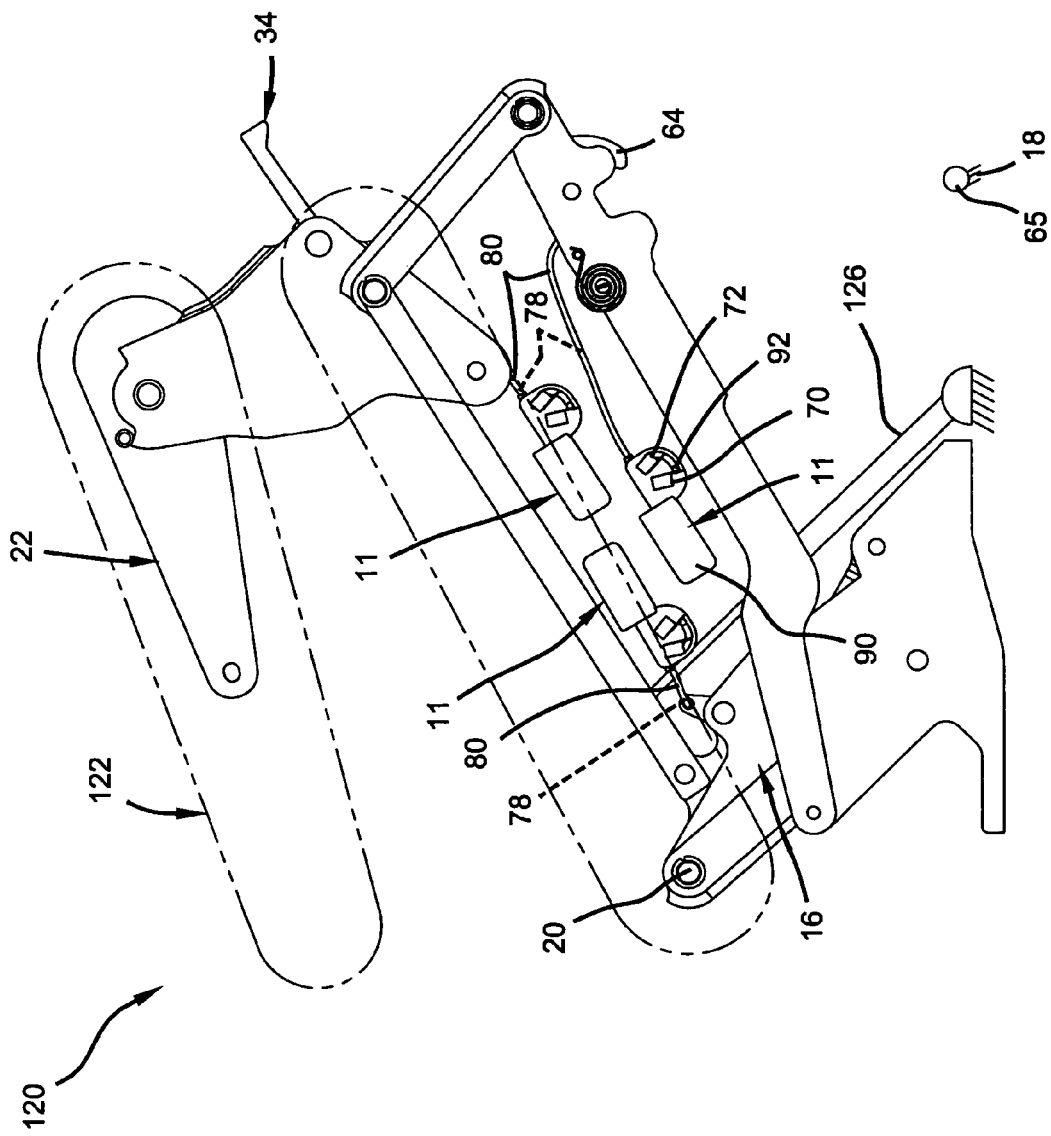

POWERED REMOTE RELEASE ACTUATOR FOR A SEAT ASSEMBLY

CROSS-REFERENCE TO RELATED APPLICATIONS

This application is a continuation of U.S. patent application Ser. No. 10/874,155 filed on Jun. 22, 2004, now U.S. Pat. No. 7,152,922 which claims the benefit of U.S. Provisional Application No. 60/569,509 filed on May 7, 2004. The disclosures of the above applications are incorporated herein by reference.

FIELD OF THE INVENTION

The present invention relates to a seat assembly and, more particularly, to a powered remote release actuator for a seat assembly.

BACKGROUND OF THE INVENTION

In automotive applications, it is desirable that a vehicle be capable of accommodating varying requirements, such as cargo carrying and the like. To that end, reconfiguration of a vehicle seating system plays a significant role. Dumping, folding flat, and/or kneeling of a seatback, enables a vehicle interior to be configurable for accommodating cargo-carrying needs. Further, such seat adjustments often provide access to a cargo area of a vehicle, thus improving storage capability and providing for large objects. Seat assemblies typically include a plurality of mechanisms to toggle the seat assembly between a use position, a reclined position, a dumped position, and a kneel position to allow an occupant to selectively configure the seat assembly as desired.

Seat assemblies, such as those used in vehicles, generally include a recliner mechanism for enabling motion of a seatback relative to a seat bottom. Such seat assemblies typically may be positioned into fold-flat position about a forward pivot to provide added floor space within a vehicle or access to an otherwise obstructed space through actuation of the recliner mechanism.

To provide dumping or stowing of the seat assembly, integrated recliner and floor-latch mechanisms are typically provided. The recliner mechanism serves to manipulate the seatback relative to the seat bottom to provide a desired position of the seatback relative to the seat bottom, as previously discussed. The floor-latch mechanism typically extends downward from the seat bottom for selective engagement with a floor to selectively permit rotation of the seat assembly into a stowed or dumped position. In operation, the recliner mechanism reclines the seatback into a fold-flat position prior to releasing the floor-latch mechanism. Once the floor-latch mechanism is released, the seat assembly is dumped forward into a stowed position. Generally, actuation of a lever in a first direction enables reclining motion of the seatback relative to the seat. Further actuation of the lever releases the seat assembly from engagement with the floor to enable forward pivoting of the complete seat assembly.

In addition, some seat assemblies provide the ability to further articulate a seat such that the seat assembly articulates forward to further increase the cargo area behind the seat. A kneel mechanism is traditionally provided to enable articulation of the seat assembly such that actuation of a lever in a first direction actuates the kneel mechanism to allow the seat assembly to articulate forward or "kneel" relative to its design or upright position.

The recliner, floor-latch, and kneel mechanisms are typically operated through a remote actuator. The remote actuator serves to selectively actuate a particular mechanism to provide a desired seating configuration. For example, an actuation handle may be provided at a remote location from the recliner and floor-latch mechanisms to allow an occupant to manipulate the seat assembly into a desired position. The remote actuator commonly includes a cable tied to the particular mechanism at a distal end and to an actuation handle at a proximal end. The actuation handle is typically rotatably supported by one of the seatback, seat bottom, or vehicle structure such that a force applied to the handle is transmitted to the cable and associated mechanism (i.e., recliner, floor-latch, or kneel).

Transmission of the force from the actuation handle to the cable causes the cable to be placed under tension and thereby transmit the force to the particular mechanism. Once the force reaches the mechanism, internal components of the respective mechanism are articulated and the mechanism is toggled into an unlocked position. For example, an actuation handle tied to a recliner mechanism allows an occupant to adjust the angular position of a seatback relative to a seat bottom simply by rotating the actuation handle. The rotational force applied to the actuation handle is transmitted to the recliner mechanism by the cable and serves to disengage the seatback from engagement with the recliner mechanism, thereby placing the recliner mechanism in an unlocked condition. When the recliner mechanism is in the unlocked condition, the occupant is allowed to adjust the angular position of the seatback relative to the seat bottom. A similar actuation handle may be associated with the floor-latch and kneel mechanisms to actuate the respective mechanisms and configure the seat assembly into a desired position.

While conventional remote actuation devices adequately provide an occupant with the ability to actuate a seat mechanism such as a recliner, floor-latch, or kneel mechanism, conventional remote actuation devices suffer from the disadvantage of requiring a plurality of actuation handles extending from a seatback, seat bottom, or other vehicle structure. Furthermore, conventional remote actuation devices suffer from the disadvantage of requiring an occupant to apply a force to an actuation handle to actuate internal components of the particular mechanism.

Therefore, a remote actuation device that minimizes the force required to actuate varying seating mechanisms is desirable in the industry. Furthermore, a remote actuation device that minimizes the number of actuation handles required to reconfigure a seating system is also desirable.

SUMMARY OF THE INVENTION

A mechanism for a vehicle seat is provided and includes a seat bottom supported by the vehicle and a seatback coupled to the seat bottom. The mechanism includes a first adjustment mechanism connected to the vehicle seat and operable between a locked position and an unlocked position and a first powered remote activation device coupled to the first adjustment mechanism. The first powered remote actuation device includes a motor and a transmission element operable to toggle the first adjustment mechanism into the unlocked position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION OF THE DRAWINGS

The present invention will become more fully understood from the detailed description and the accompanying drawings, wherein:

FIG. 16 is a side view of a third seat adjustment mechanism incorporated into a third seat assembly having a kneel mechanism; and FIG. 17 is a side view of the seat assembly of FIG. 16 in a folded-flat and dumped position.

DETAILED DESCRIPTION OF THE PREFERRED EMBODIMENTS

Figure 1:
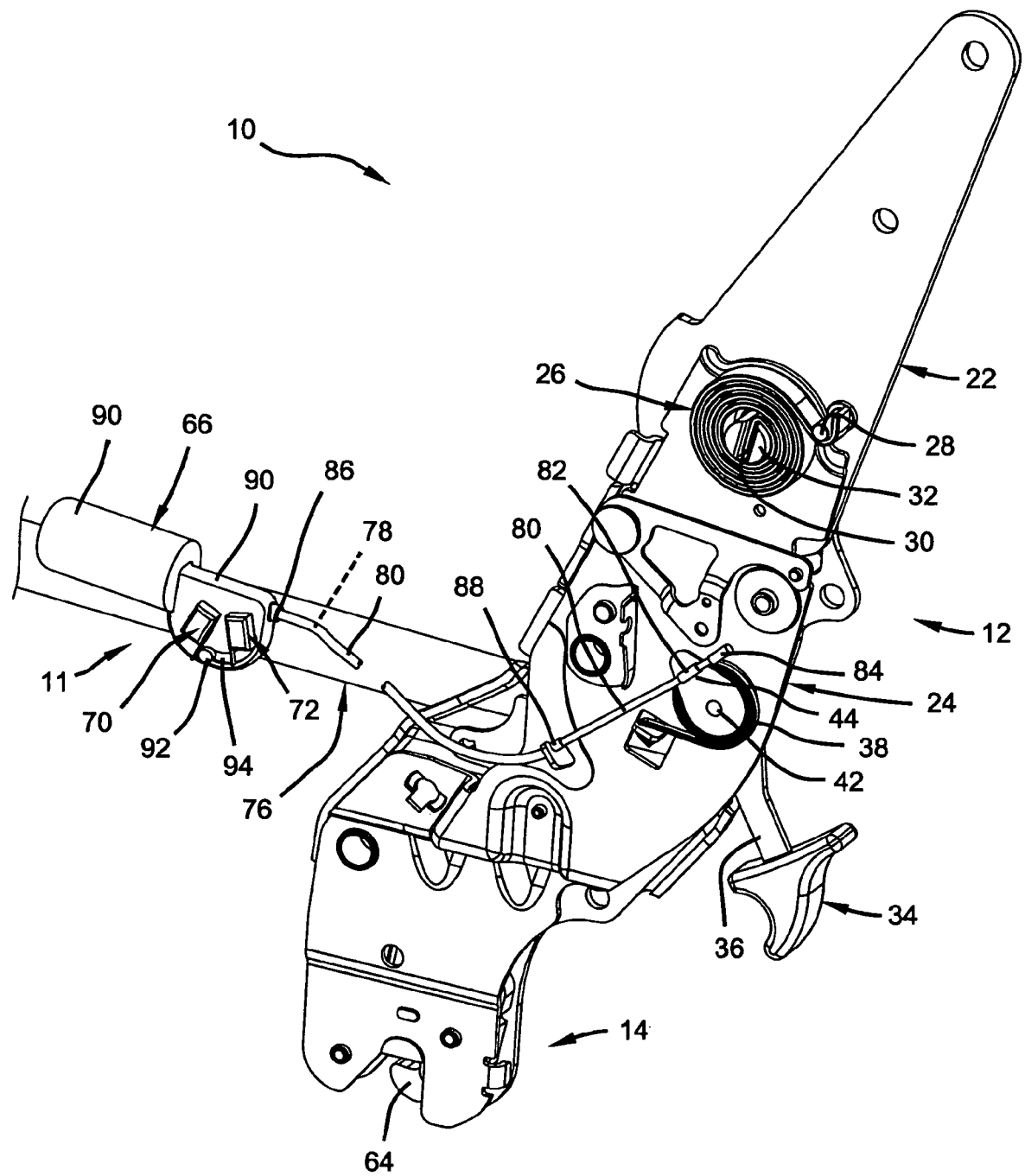
FIG. 1 is a perspective view of a seat adjustment mechanism incorporating an actuation mechanism in accordance with the principles of the present invention.

The following description of the preferred embodiment(s) is merely exemplary in nature and is in no way intended to limit the invention, its application, or uses.

With reference to the figures, a seat adjustment mechanism 10 is provided and includes a powered remote actuation device 11, a recliner mechanism 12, a floor-latch mechanism 14, and a kneel mechanism 16. The recliner mechanism 12 provides a user with the ability to position a seatback relative to a seat bottom to provide a desired angular position of the seatback relative to the seat bottom. In addition, the recliner mechanism 12 allows a user to position the seatback in a folded-flat position such that the seatback is generally parallel with the seat bottom to provide a flat workspace or load floor.

Figure 4:
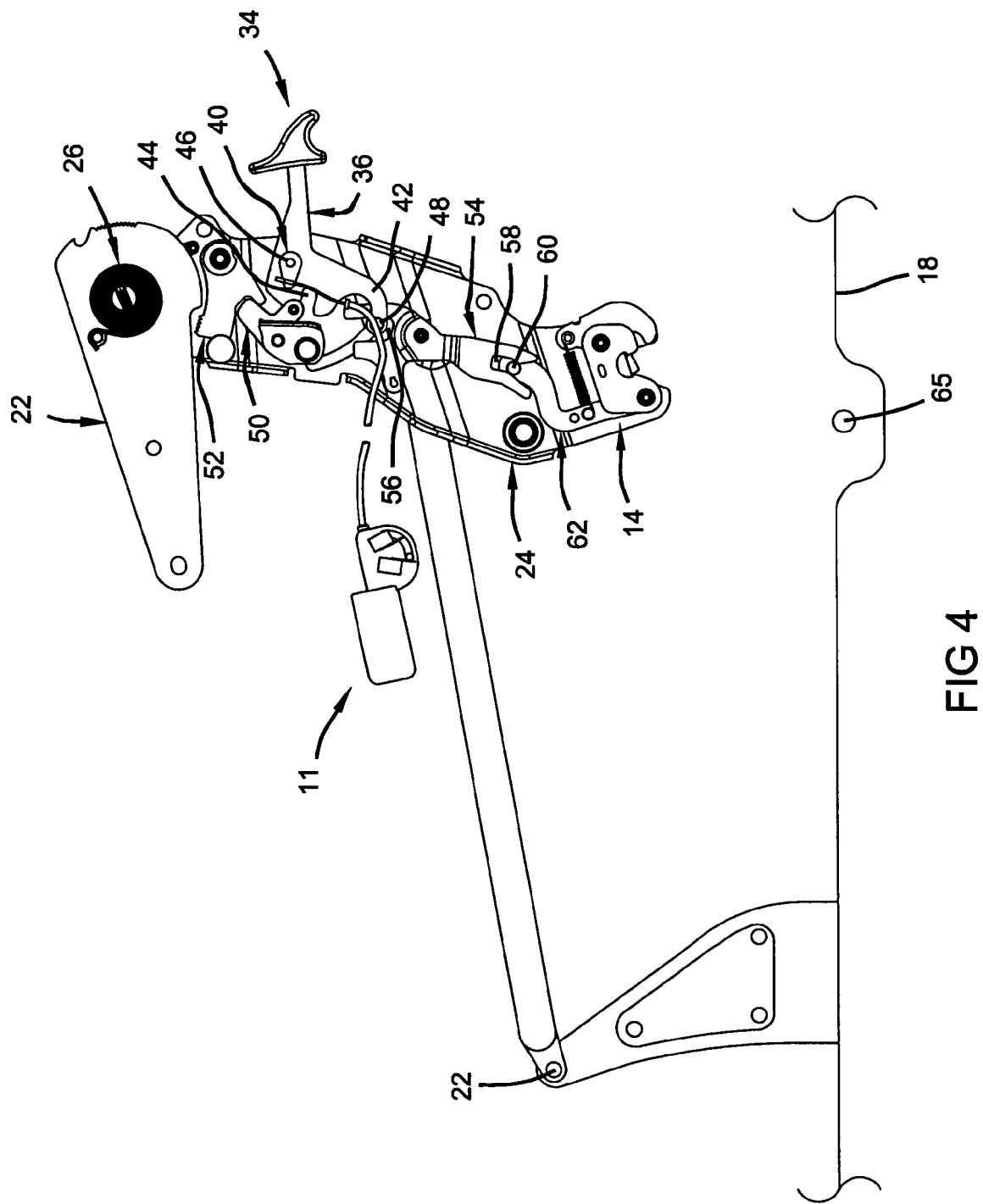
FIG. 4 is a side view of the seat adjustment mechanism of FIG. 1 in a folded-flat and unlatched position.

The floor-latch mechanism 14 selectively anchors the seat adjustment mechanism 10 to an external structure, such as a vehicle floor pan 18, to allow the seat adjustment mechanism 10 to selectively rotate about a forward pivot 20, as best shown in FIG. 4. The kneel mechanism 16 allows the seat adjustment mechanism 10 to pivot forward, or rotate relative to the floor pan 18 to simultaneously adjust a fore-aft and up-down position of the seat adjustment mechanism 10. The powered remote actuation device 11 functions in harmony with at least one of the recliner mechanism 12, floor-latch mechanism 14, and kneel mechanism 16, to facilitate actuation thereof, as will be discussed further below.

With particular reference to FIGS. 1-4, the seat adjustment mechanism 10 is shown to include the recliner mechanism 12 and floor-latch mechanism 14. While the seat adjustment mechanism 10 will be hereinafter described in conjunction with a recliner mechanism 12 and floor-latch mechanism 14, it should be understood that the powered remote actuation device 11 of the present invention could similarly be used to actuate each individual mechanism 12, 14, 16. In addition, the powered remote actuation device 11 could similarly be used with any combination of the recliner mechanism 12, floor-latch mechanism 14, and kneel mechanism 16, including incorporating all three mechanisms 12, 14, 16 into a single assembly 10 for use in actuation of each mechanism 12, 14, 16.

Incorporating the recliner mechanism 12 and floor-latch mechanism 14 into a single assembly provides a manufacturing advantage through utilization of common components. Specifically, incorporating the recliner mechanism 12 and floor-latch mechanism 14 into a single assembly reduces both cost and complexity in manufacturing an assembly of the seat adjustment mechanism 10. The combination recliner/floor-latch mechanism is preferably of the type such as disclosed in U.S. patent application Ser. No. 10/278,414, filed on Oct. 23, 2002, which claims priority to U.S. Provisional Application No. 60/334,850, filed on Nov. 30, 2001, the disclosures of which are incorporated herein by reference.

Figure 2:
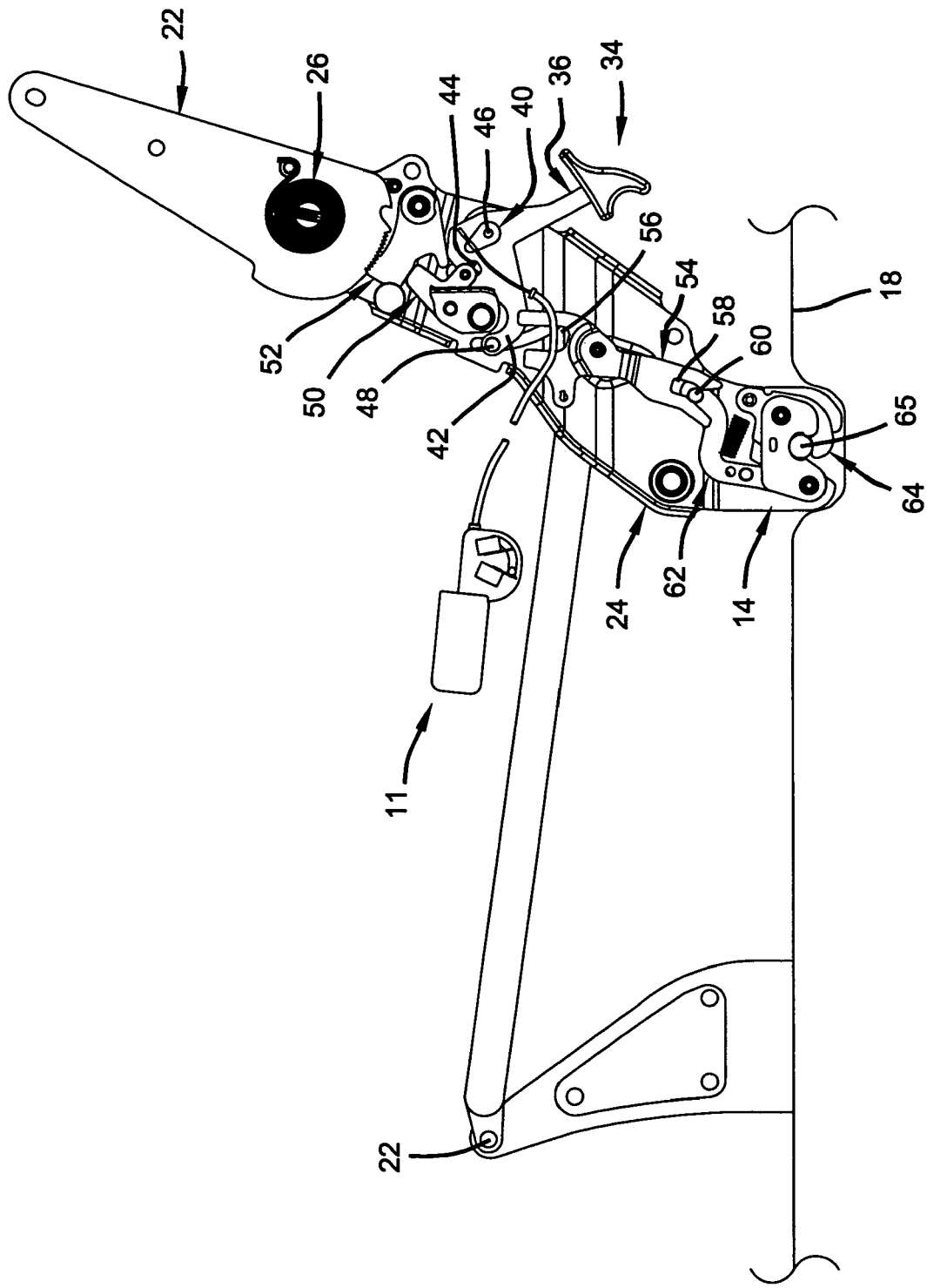
FIG. 2 is a side view of the seat adjustment mechanism of FIG. 1 in an upright position and latched position.

The recliner mechanism 12 includes a seatback support 22 and a housing assembly 24. The seatback support 22 is rotatably supported by the housing assembly 24 and is selectively fixed thereto to position the seatback support 22 in a desired position relative to the housing assembly 24. The seatback support 22 is biased in the counterclockwise direction relative to the view shown in FIG. 2 by a coil spring 26. The coil spring 26 is fixedly attached to the seatback support 22 at a spring post 28 at a first end and to the housing assembly 24 at a spring slot 30 formed in a pivot 32, as best shown in FIG. 2. In this manner, a force must be applied to the seatback support 22 to rotate the seatback support 22 in the clockwise direction relative to the view shown in FIG. 2 about pivot 32. However, before the seatback support 22 can be rotated relative to the housing assembly 24, the seatback support 22 must be unlocked from the housing assembly 24.

An actuation assembly 34 is provided to aid in unlocking the seatback support 22 from the housing assembly 24. The actuation assembly 34 includes an actuation handle 36, a coil spring 38, and a lever 40. The actuation handle 36 is rotatably supported by the housing assembly 24 and is fixedly attached to the lever 40 such that rotation of the actuation handle 36 causes concurrent rotation of the lever 40. The actuation handle 36 includes an extension 42, a recess 44, and a pivot 46, whereby the actuation handle 36 rotates relative to the housing assembly 24 about pivot 46. The extension 42 is formed proximate to the recess 44 and includes a roller 48 for interaction with the floor-latch mechanism 14, as will be discussed further below.

The recess 44 is formed generally between the pivot 46 and the extension 42 and serves to selectively rotate a cam plate 50 into and out of engagement with a pawl 52 to selectively prevent rotation of the seatback support 22 relative to the housing assembly 24. Specifically, rotation of the actuation handle 36 in the counterclockwise direction relative to the view shown in FIG. 2, causes the recess 44 to engage the cam 50, thereby rotating the cam 50 in the clockwise direction. Sufficient rotation of the cam 50 in the clockwise direction, causes the cam 50 to rotate the pawl 52 in the counterclockwise direction. Sufficient rotation of the pawl 52 in the counterclockwise direction causes the pawl 52 to disengage the seatback support 22 and permit rotation of the seatback support 22 relative to the housing assembly 24. Once the pawl releases the seatback support 22, the coil spring 26 biases the seatback support 22 in the counterclockwise direction, as previously discussed.

The coil spring 38 biases the actuation handle 36 in the clockwise direction relative to the view shown in FIG. 2, such that once the handle 36 is released, coil spring 38 is allowed to bias the handle 36 back into a home position. In this manner, the coil spring 38 serves to bias the pawl 52 into engagement with the seatback support 22 through interaction between the recess 44 and cam plate 50 due to the biasing force exerted on the actuation handle 36. More particularly, the coil spring 38 imparts a rotational force on the actuation handle 36 in the clockwise direction, thereby causing the recess 44 to engage the cam plate 50 and cause the cam plate 50 to rotate in the counterclockwise direction. Rotation of the cam plate 50 in the counterclockwise direction causes concurrent rotation of the pawl 52 in the clockwise direction and into engagement with the seatback support 22. Therefore, the recliner mechanism 12 is biased into a locked position (i.e., when the pawl 52 is engaged with the seatback support 22) by the coil spring 38 to prevent rotation of the seatback support 22 relative to the housing assembly.

Figure 3:
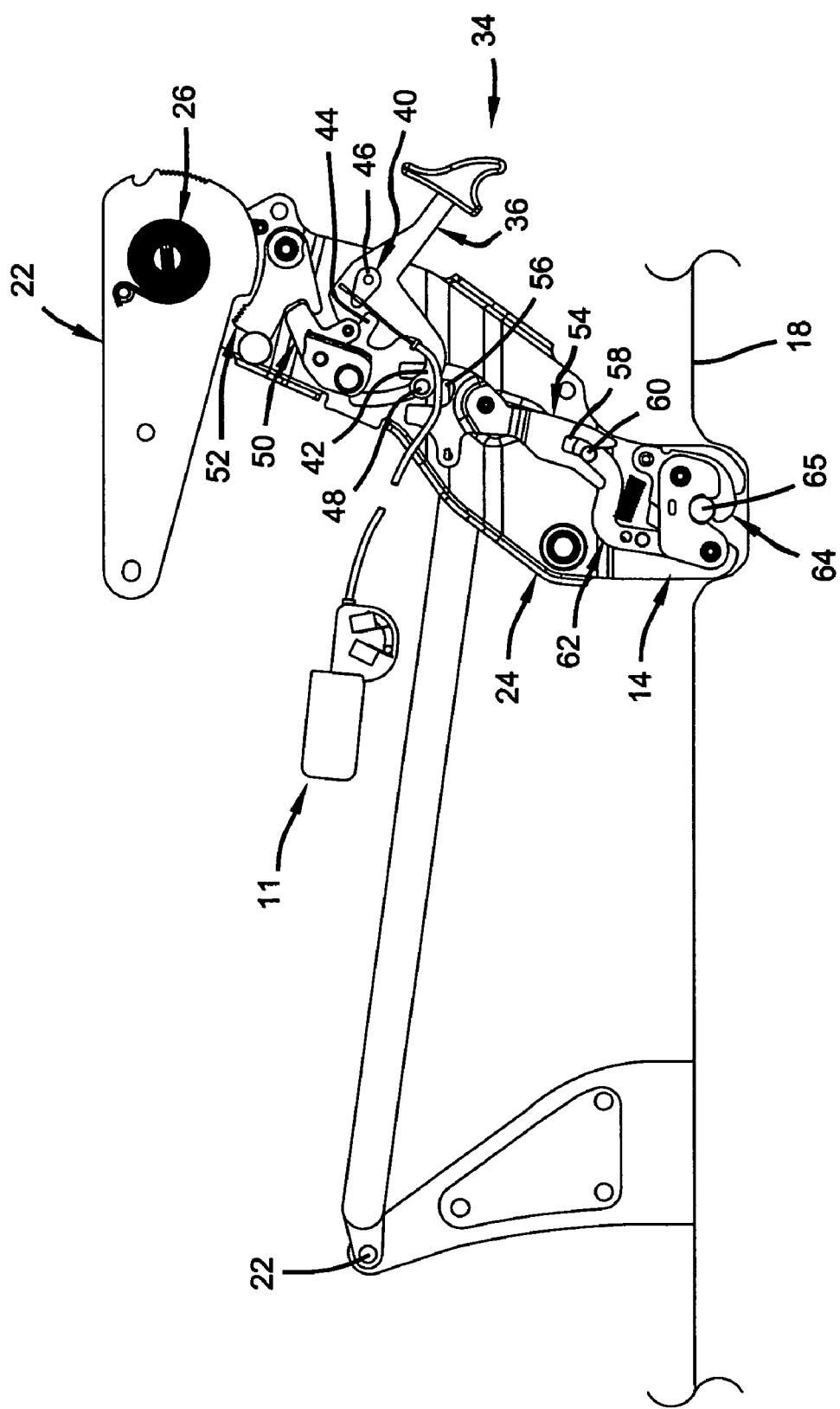
FIG. 3 is a side view of the seat adjustment mechanism of FIG. 1 in a folded-flat position and latched position.

The actuation handle 36 is also in mechanical communication with the floor-latch mechanism 14 via a link 54, as best shown in FIGS. 2-4. The link 54 is rotatably supported by the housing assembly 24 and includes a first recess 56 and a second recess 58. The first recess 56 rotatably receives the roller 48 of extension 42 while the second recess 58 receives a roller 60 of the floor-latch mechanism 14, as best shown in FIGS. 2-4.

During actuation of the handle 36, the recess 44 engages the cam plate 50 to thereby cause the pawl 52 to disengage the seatback support 22 and allow rotation of the seatback support 22 relative to the housing assembly 24, as previously discussed. Once the seatback support 22 is released, further rotation of the actuation handle in the counterclockwise direction, relative to the view shown in FIGS. 2-4, causes the roller 48 to engage the first recess 56 of the link 54. Once the roller 48 engages the link 54, further rotation of the actuation handle 36 in the counterclockwise direction will cause rotation of the link 54 in the clockwise direction due to the interaction between the roller 48 and the first recess 56.

Roller 60 is fixedly supported by a link 62, disposed generally within the floor-latch mechanism 14, as best shown in FIGS. 2-4. The link 62 is operably connected with a claw 64 of the floor-latch mechanism 14 such that rotation of the link 62 in the clockwise direction, relative to the view shown in FIG. 2, causes concurrent rotation of the claw 64 in the counterclockwise direction. Sufficient rotation of the claw 64 in the counterclockwise direction causes the floor-latch mechanism 14 to disengage a striker 65 fixedly supported by the floor pan 18. Once the claw 64 disengages the striker 65, the floor-latch mechanism 14 is in the unlocked position, thereby disengaging the seat adjustment mechanism 10 from the floor pan 18 and permitting rotation of the seat adjustment mechanism 10 about the forward pivot 20, as will be discussed further below.

As previously discussed, to toggle the recliner mechanism 12 and floor-latch mechanism 14 into the unlocked positions, a force must be applied to the actuation handle 36. The powered actuation device 11 allows a user to toggle the recliner mechanism 12 and floor-latch mechanism 14 into the unlocked position by simply actuating a switch, thereby obviating the need to manually apply a force the actuation handle 36.

With particular reference to FIGS. 5-8, the powered remote actuation device 11 will be described in detail. The powered remote actuation device 11 applies a force to the lever 40 to thereby rotate the actuation handle 36, and toggle the recliner mechanism 12 and floor-latch mechanism 14 into the unlocked positions. In doing so, the powered remote actuation device 11 obviates the need for a user to exert a force on the actuation handle 36 to release the recliner and floor-latch mechanisms 12, 14. The powered remote actuation device 11 includes a DC motor 66 driven by an external power source 67, a double relay 68, a first limit switch 70, a second limit switch 72, an actuation button 74, and a cable assembly 76.

The cable assembly 76 is driven by the output of the DC motor 66 and serves to selectively apply a force to the lever 40 of the actuation handle 36. As the motor 66 applies a force to the cable assembly 76, the force is transmitted to the actuation handle 36 via lever 40 to thereby rotate the actuation handle 36 relative to the housing assembly 24. As previously discussed, sufficient rotation of the lever 40 and actuation handle 36, releases the recliner mechanism 12 and floor-latch mechanism 14, thereby toggling the recliner and floor-latch mechanisms 12,14 into the unlocked position.

The cable assembly 76 includes a cable 78, a cable sheath 80, a barrel 82, and an end fitting 84. The cable 78 is operably attached to an output of the DC motor 66 at a first end, such that a rotational output of the motor 66, caused by current supplied to the motor 66 via power source 67, causes the cable 78 to be placed under tension. Placing the cable 78 under tension causes the cable 78 to move within, and relative to, sheath 80, thereby imparting a force on the lever 40, as will be described further below.

The barrel 82 is fixedly attached to the lever 40, such that rotation of the lever 40 causes concurrent rotation of the barrel 82. The barrel 82 slidably receives the cable 78, and thus allows the cable 78 to freely translate within the barrel 82 without causing concurrent movement of the lever 40. In this manner, the barrel 82 provides lost motion for the cable 78 to avoid a compressive load on the cable 78 during either manual or electrical manipulation of the handle 36. The end fitting 84 is fixedly attached to a second end of the cable 78, as best shown in FIGS. 3-4. The end fitting 84 has an outer diameter that is generally greater than an inner diameter of the barrel 82 such that the end fitting 84 is restricted from traveling through the barrel 82 when the cable 78 is placed under tension.

The cable sheath 80 is fixedly attached at a first end 86 generally proximate to the DC motor 66 and to the housing assembly 24 at a second end 88. The cable sheath 80 functions to both protect the cable 78 and also to properly position the cable 78 with respect to both the motor 66 and the barrel 82.

Figure 5:
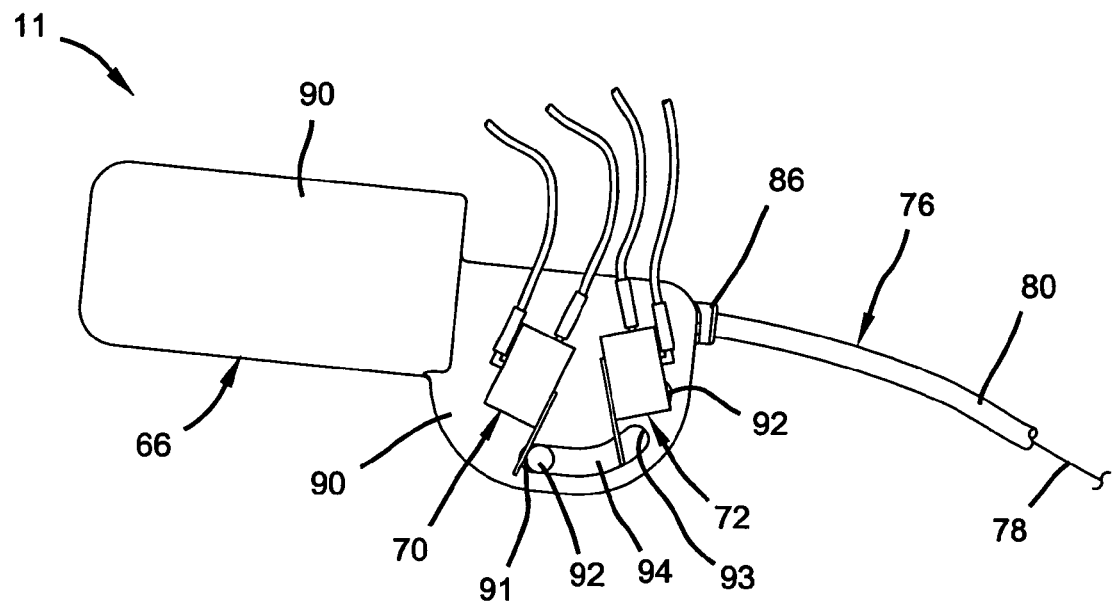
FIG. 5 is a side view of the actuation mechanism of FIG. 1 in a first position.
Figure 6:
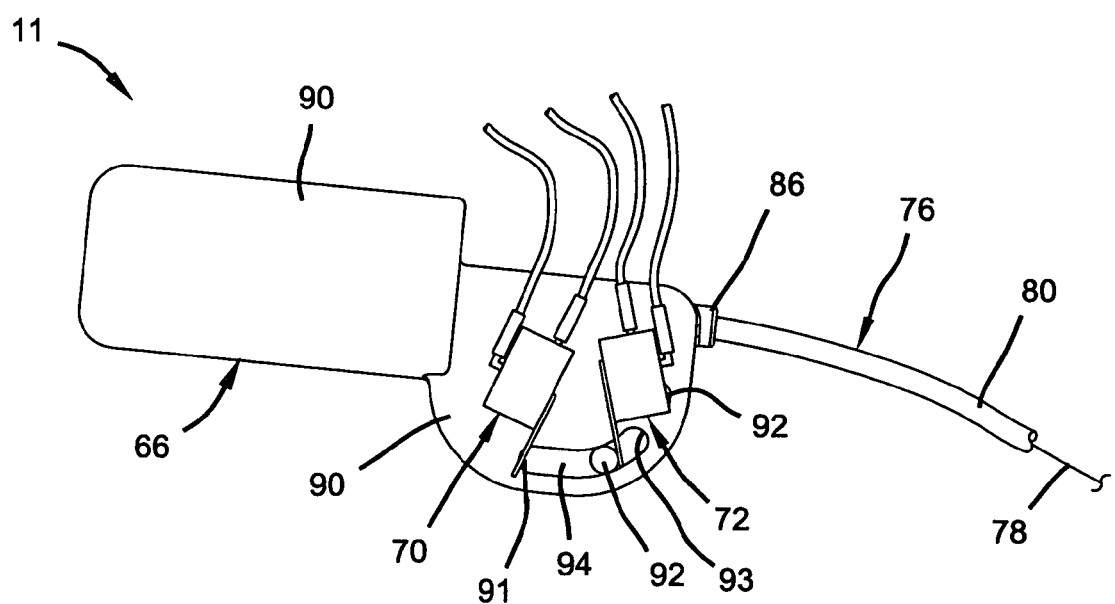
FIG. 6 is a side view of the actuation mechanism of FIG. 1 in a second position.
Figure 7:
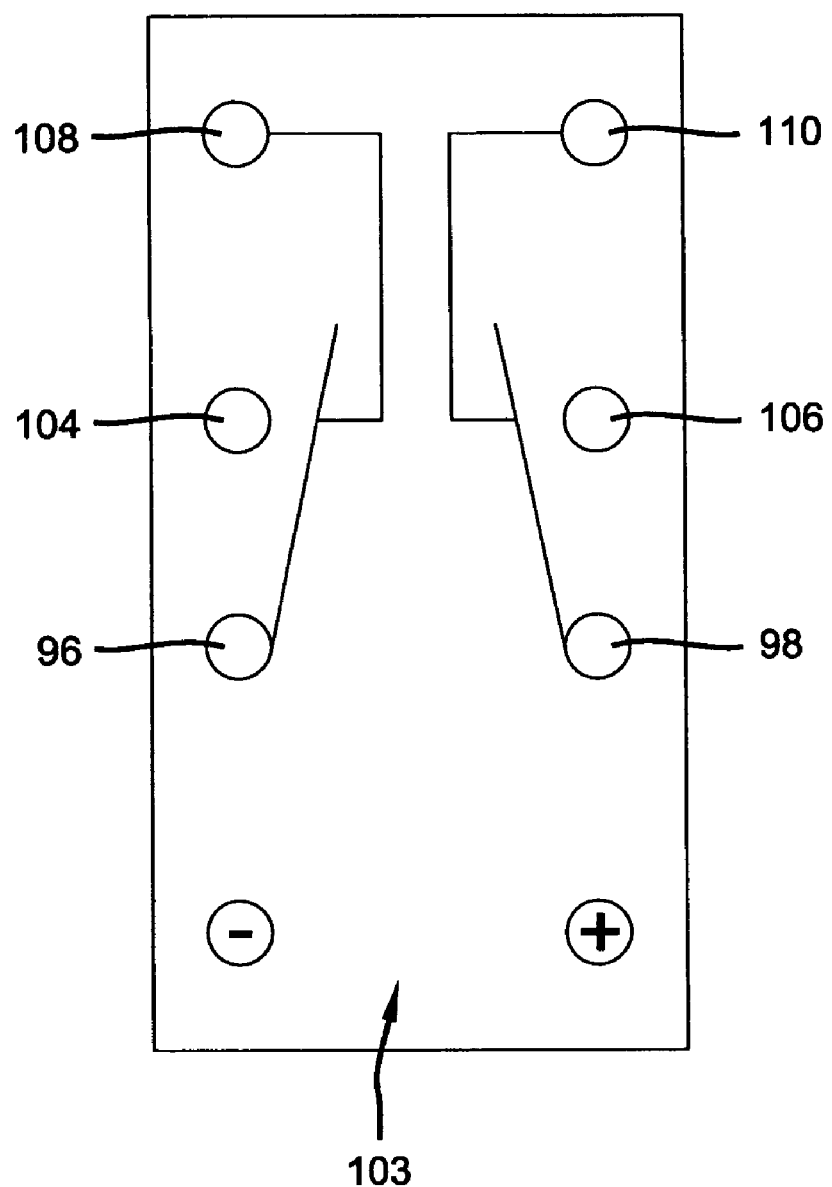
FIG. 7 is a schematic diagram of a double relay in accordance with the principles of the present invention.

The DC motor 66 is disposed generally within a motor housing 90 and includes an output shaft (not shown) in driving engagement with the cable 78 of the cable assembly 76. The output shaft is operably connected to a post 92, such that as the motor 66 drives the output shaft and cable 78, the post 92 is also caused to rotate relative to the motor housing 90. The post 92 extends generally through a slot 94 formed in the motor housing 90 and translates between first and second ends 91, 93 of the slot 94 due to rotation of the output shaft, as best shown in FIGS. 5 and 6. When the DC motor 66 drives the cable 78, the post 92 is driven along the slot 94 and selectively engages the first and second limit switches 70, 72 to toggle the polarity of the motor 66, as will be described further below.

The motor 66 begins to drive the cable 78 once a force is applied to the actuation button 74. Once the motor 66 is energized by the power source 67 (due to activation of the actuation button 74), the post 92 will disengage the first limit switch 70 and travel toward the second limit switch 72, as best shown in FIGS. 5 and 6. At this point, the motor 66 is imparting a tensile force on the cable 78 and thus causes the cable 78 to impart a force on the lever 40 and actuation handle 36 through engagement between the end fitting 84 and the barrel 82. The tensile force causes the cable 78 to translate within the sheath 80 such that the end fitting 84 engages the barrel 82. Once the end fitting 84 engages barrel 82, the force applied by the motor 66, via cable 78, causes the lever 40 and actuation handle 36 to rotate about the pivot 46 of the actuation handle 36.

As previously discussed, sufficient rotation of the actuation handle 36 causes the recess 44 to engage the cam plate 50 to thereby release the pawl 52 from engagement with the seatback support 22. Once the seatback support 22 is released from engagement with the pawl 52, continued rotation of the lever 40 and actuation handle 36 will release the floor-latch mechanism 14 due to the relationship between the link 54 and the rollers 48, 60, as previously discussed. At this point, the recliner mechanism 12 and floor-latch mechanism 14 are both in the unlatched position and further rotation of the actuation handle 36 is unnecessary.

The post 92 serves to prevent further movement of the cable 78 once the recliner and floor-latch mechanisms 12, 14 are in the unlocked position by contacting the second limit switch 72 and reversing the direction of the motor 66. In doing so, the interaction between the second limit switch 72 and the post 92 serves two functions. First, the interaction between the post 92 and the second limit switch 72 causes the motor 66 to stop exerting a tensile force on the cable 78 and thus, ceases to exert a rotational force on the actuation handle 36 and link 54. Second, the interaction between the post 92 and the second limit switch 72 serves to reverse the polarity of the motor 66 and cause the motor 66 to rotate in the opposite direction. In this state, the motor 66 allows the cable 78 to unwind, thereby allowing the cable 78 to slack, as will be described further below.

The slack in the cable 78 allows the actuation handle 36 to be biased by the coil spring 38 and rotate in the clockwise direction, relative to the view shown in FIG. 2. As can be appreciated, if the motor 66 continued to exert a tensile force on the cable 78, the lever 40 would be restricted from rotating in the clockwise direction due to the interaction between the end fitting 84 and the barrel 82. Placing the cable 78 in a slacked condition once the respective mechanisms 12, 14 are in the unlocked position, allows the actuation handle 36 and link 54 to return to a home or locked position under bias from coil spring 38.

Once the cable 78 has a sufficient slack such that the actuation handle 36 and link 54 return to the locked position, rotation of the motor 66 stops. As can be appreciated, once the motor 66 switches direction due to the interaction between the second limit switch 72 and the post 92, the post 92 travels along the slot 94 generally toward the first limit switch 70, as best shown in FIG. 5. The motor 66 will cease rotation once the post 92 contacts the first limit switch 70, and will remain in a rest condition until a force is applied to the actuation button 74, thereby cycling the motor 66. It should be noted that the length of the slot 94 is designed such that the travel from the first limit switch 70 to the second limit switch 72 allows enough cable stroke (i.e., distance or cable travel) for the release of the recliner and floor-latch mechanisms 12, 14 and also for the motor 66 to rotate in an opposite direction to provide slack in the cable 78. In other words, the relative position between the first and second limit switches 70, 72 along slot 94 is governed by the requisite rotation of the actuation handle 36 needed to toggle the mechanisms 12,14 into the unlocked position.

The double relay 68 toggles power based on the position of the switches 70, 72. More particularly, the double relay 68 is controlled by the first and second limit switches 70, 72 to reverse the polarity of the motor 66 (i.e., direction of rotation of the output shaft) when the recliner and floor-latch mechanisms 12, 14 are in the unlocked position and to ensure that the cable 78 is relieved (i.e., slacked) once the mechanisms 12, 14 are released.

The double relay 68 is designed to provide power to two input terminals 96, 98, which are connected to two motor input terminals 100, 102, respectively. The double relay 68 includes a trigger circuit 103 that allows a first set of power inputs 104, 106 and a second set of power inputs 108, 110 to be alternatively connected to input terminals 96, 98. The first pair of power inputs 104, 106 and the second pair of power inputs 108, 110 are identical. In this manner, each pair of the power inputs 104, 106 and 108, 110, respectively, are essentially identical, except for their opposite polarity.

The double relay 68 is operable between a relaxed state and an energized state. In the relaxed state, the relay 68 is connected to motor terminals 108, 110 via inputs 96, 98, and assigns a first polarity to the motor 66. At this point, the post 92 is in contact with the first limit switch 70 and the motor 66 is not energized. When the relay 68 is energized, through activation of the actuation button 74, the trigger circuit 103 becomes energized and terminals 104, 106 are connected to terminals 96, 98, thereby assigning a second polarity to the motor 66. The second polarity is an opposite polarity than the first polarity, and thus, allows for reversal of motor polarity. The reversal in polarity allows the motor 66 to both place the cable 78 under tension to unlock the recliner and floor-latch mechanisms 12, 14 and to return the cable 78 to the relaxed state upon release of the recliner and floor-latch mechanisms 12, 14.

It should be understood that while a positive polarity is assigned to the motor 66 for terminals 108, 110 and a negative polarity is assigned to the motor 66 for terminals 104, 106, that either set of terminals 104, 106 or 108, 100 may be assigned a positive or a negative polarity so long as the other set is assigned an opposite polarity. As can be appreciated, such a relationship ensures that the motor 66 will change polarity, and thus, its rotational direction when instructed to do so by the relay 68, as will be discussed further below.

Figure 8:
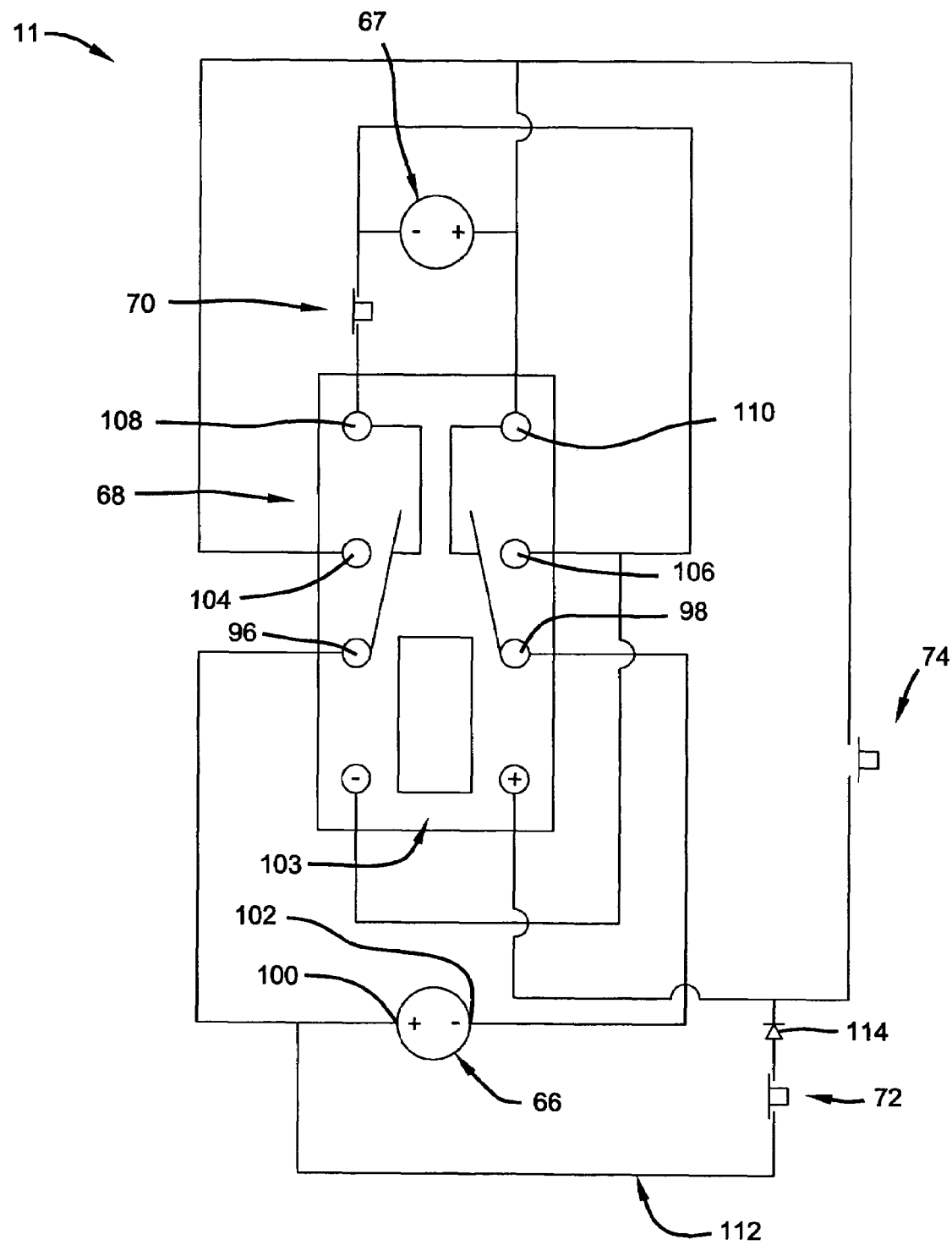
FIG. 8 is a schematic diagram of the actuation mechanism of FIG. 1 incorporating the double relay of FIG. 7.

A jumper circuit 112 is provided to allow the motor 66 to continue running after the actuation button 74 is released to ensure that the actuation handle 36 is returned to the home position once the recliner and floor-latch mechanisms 12, 14 are in the unlocked position. In addition, the jumper circuit 112 allows for one-touch operation of the adjustment mechanism 10 such that a user is only required to apply a single force to the actuation button 74 to release the mechanisms 12, 14 and to return the cable 78 to the relaxed state. The jumper circuit 112 is connected to terminal 96 generally proximate to motor input 100 and is fed back to the trigger circuit 103, as shown in FIG. 8.

In operation, a force is applied to the actuation button 74 to close the circuit between the power source 67 and the motor 66 to thereby supply the motor 66 with power. At this point, the relay 68 is energized such that terminals 104 and 106 are connected to terminals 96, 98 and terminals 108, 110 are disconnected from terminals 96, 98. Power is supplied to the motor 66 from the power source 67 via terminals 104, 106 and terminals 96, 98 and will continue to flow as such until the post 92 contacts the second limit switch 72.

Once the motor 66 is energized, the output of the motor 66 will apply a force to the cable 78 to rotate the lever 40 and release the recliner and floor-latch mechanisms 12, 14, as previously discussed. The actuation button 74 is a normally open switch, and will therefore open the circuit once the button 74 is released. However, power is still supplied to the motor 66 once the actuation button 74 is released (i.e., opened) due to the interaction between the jumper 112 and the relay 68. In this manner, the power source 67 continues to drive the motor 66 in a first rotational direction until the second limit switch 72 is triggered.

The second limit switch 72 is a normally closed switch and therefore allows power to flow from power source 67 to the motor 66 once the actuation button 74 is released. The switch 72 maintains the closed circuit between the relay 68, power source 67, and motor 66 until the switch is triggered by the post 92. Specifically, power will flow from terminal 96, through limit switch 72 and finally through a diode 114 and to the trigger circuit 103, as best shown in FIG. 8. In this manner, the motor 66 is supplied with power until the second limit switch 72 is opened. Note that the diode 114 is supplied to restrict current from flowing from the power source 67, through the actuation button 74, and into the motor 66 when the button 74 is initially depressed. In other words, the diode 114 allows power to flow to the motor 66 and back into the trigger circuit 103, but prevents power from reaching the motor through the second limit switch 72, as best shown in FIG. 8.

The second limit switch 72 is opened once the recliner and floor-latch mechanisms 12, 14 are in the unlocked position due to the travel of the post 92 along slot 94. Specifically, once the post 92 has sufficiently traveled along slot 94 such that the cable 78 has unlocked the recliner and floor-latch mechanisms 12, 14, the post 92 will engage the second limit switch 72 and open the jumper 112. Once the jumper 112 is opened, the relay 68 toggles back to the relaxed state as power is no longer supplied to the trigger circuit 103 via jumper 112. At this point, terminals 108, 110 are once again connected to terminals 96 and 98 while terminals 104, 106 are disconnected. Once the terminals 108, 110 are connected to the power source 67, the polarity of the motor 66 is reversed and the motor 66 will rotate in a second rotational direction.

The motor 66 releases tension in the cable 78 once the post 92 begins to travel along slot 94 (i.e., in the second rotational direction), generally toward the first limit switch 70 to allow the coil spring 38 to bias the actuation handle 36. The first limit switch 70 is a normally closed switch and will therefore keep power supplied to the motor 66 until opened.

The first limit switch 70 is opened once the post 92 has sufficiently traveled along slot 94 and contacts switch 70. At this point, the circuit between the power source 67 and the motor 66 is opened and the motor 66 shuts down. Because the post 92 maintains engagement with the first limit switch 70 until the actuation button 74 is depressed, the circuit remains open and the motor 66 remains in the shut down mode.

Figure 9:
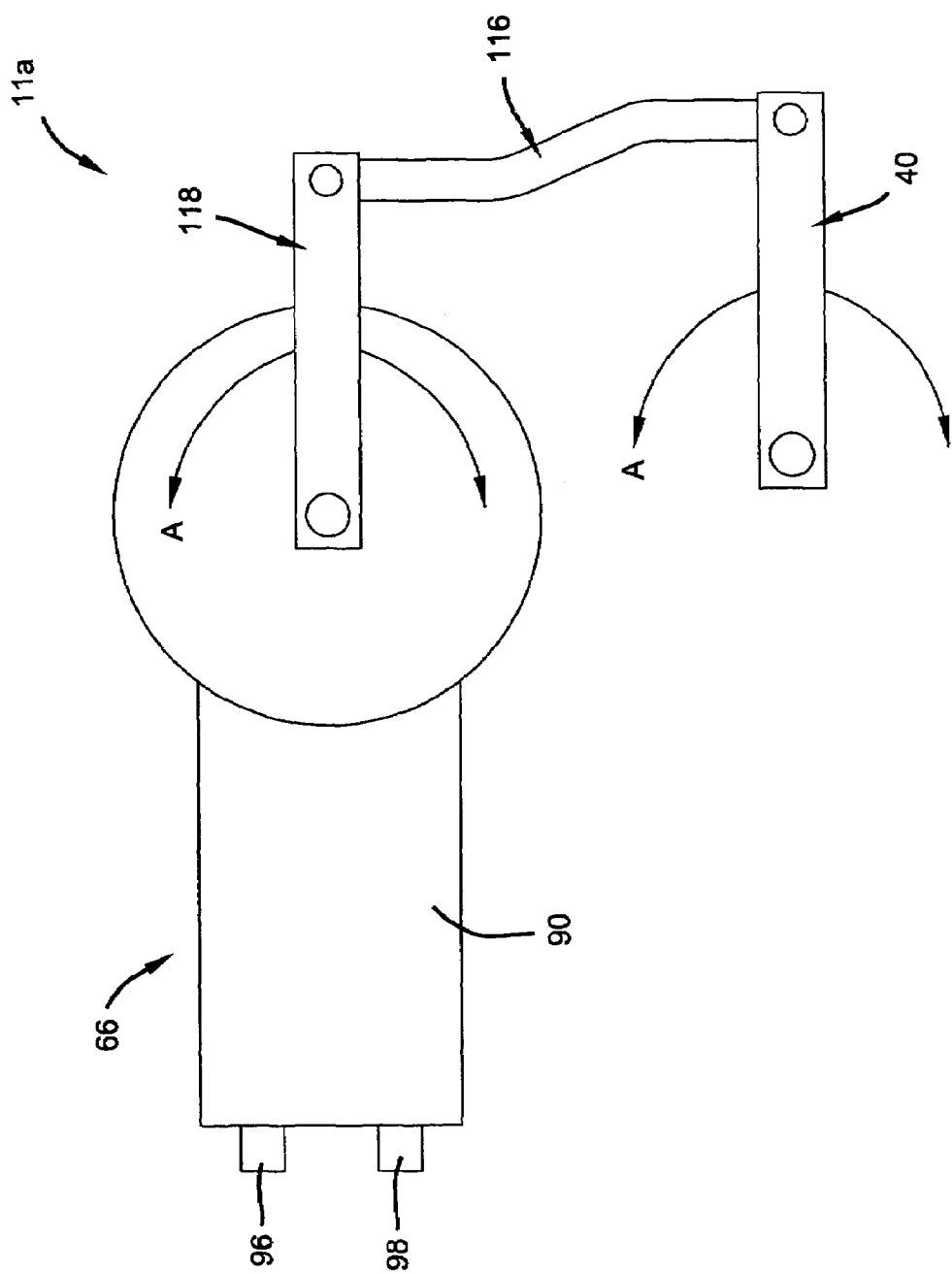
FIG. 9 is a side view of a second actuation mechanism in accordance with the principles of the present invention.

With particular reference to FIG. 9, a second embodiment of the powered remote actuation device 11a is shown having a motor 66, an output 118, and a link 116.

In general, the powered remote actuation device 11a is substantially similar to the powered remote actuation device 11 described above. In view of the substantial similarity in structure and function of the components associated with the powered remote actuation device 11 and the powered remote actuation device 11a, like reference numerals are used here and in the drawings to identify like components.

The link 116 is rotatably attached to the motor output 118 at a first end and rotatably attached to the actuation handle 36 at a second end. In this manner, as the motor 66 drives the output 118, the link 116 is caused to translate, thereby imparting a rotational force (A) on the actuation handle 36, via lever 40, as shown in FIG. 9. As previously discussed, sufficient rotation of the actuation handle 36 will toggle the recliner and floor-latch mechanisms 12, 14 into the unlocked position. Operation of the double relay 68 and first and second limit switches 70, 72 is substantially identical to the powered remote actuation device 11. Therefore, a detailed description is foregone.

Figure 10:
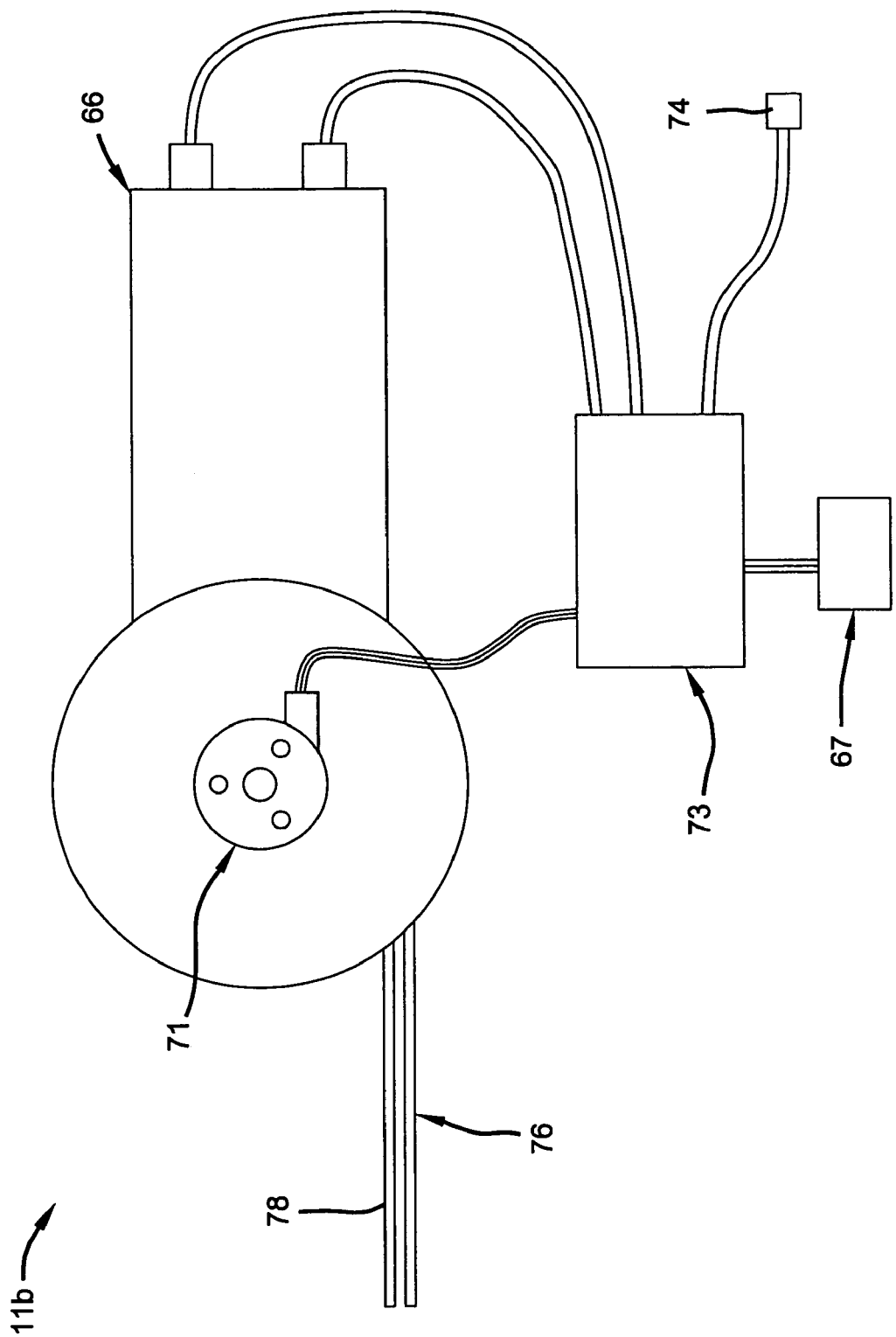
FIG. 10 is a side view of a third actuation mechanism in accordance with the principles of the present invention.

With particular reference to FIG. 10, a third embodiment of the powered remote actuation device 11b is shown having a DC motor 66 driven by an external power source 67, a potentiometer 71, a controller 73, an actuation button 74, and a cable assembly 76.

In general, the powered remote actuation device 11b is substantially similar to the powered remote actuation device 11 described above. In view of the substantial similarity in structure and function of the components associated with the powered remote actuation device 11 and the powered remote actuation device 11b, like reference numerals are used here and in the drawings to identify like components.

The powered remote actuation device 11b applies a force to the lever 40 to thereby rotate the actuation handle 36, and toggle the recliner mechanism 12 and floor-latch mechanism 14 into the unlocked positions, as discussed previously. In doing so, the powered remote actuation device 11b obviates the need for a user to exert a force on the actuation handle 36 to release the recliner and floor-latch mechanisms 12, 14.

The powered remote actuation device 11b utilizes the potentiometer 71 and controller 73 to selectively supply a force to the cable 78 to selectively release the recliner and floor-latch mechanisms 12, 14. The potentiometer 71 may be mounted to the motor 66 or to an output shaft of the motor 66 for rotation therewith. As the motor output shaft rotates, potentiometer 71 voltage output changes based on a rotational position of the motor output shaft. Because the motor output shaft drives the cable 78, the rotational position of the motor output shaft is indicative of cable stroke (i.e., distance or cable travel).

The controller 73 monitors the voltage output of the potentiometer 71 to track the position of the cable 78 and, thus, the status of the recliner and floor-latch mechanism 12, 14. Each cable position has a distinct voltage reading. Therefore, the controller 73 can easily monitor cable position, based on the voltage readings from the potentiometer 71.

The controller 73 may be programmed to power the motor 66 until a predetermined voltage signal is received from the potentiometer 71 to provide a desired position of the recliner or floor-latch mechanism 12, 14. For example, the controller 73 may be programmed to cut power to the motor 66 when the cable 78 initially releases the recliner mechanism 12 prior to releasing the floor-latch mechanism 14. At this point, only the recliner mechanism 12 is released, and the controller 73 will wait for a second input prior to energizing the motor 66. Once a second input is received by the controller 73, such as depression of the actuation button 74, the controller 73 will supply power to the motor 66 once again.

The motor 66 will exert a force on the cable 78 until the controller 73 receives a pre-determined voltage signal from the potentiometer 71. The predetermined voltage signal correlates to a predetermined number of revolutions of the motor output shaft required to sufficiently pull the cable 78 and release the floor-latch mechanisms 14. In this manner, the controller 73, in combination with the potentiometer 71, provides the powered remote actuation device 11b with the ability to selectively release each of the mechanisms 12, 14, 16 individually, or any combination thereof.

Figure 11:
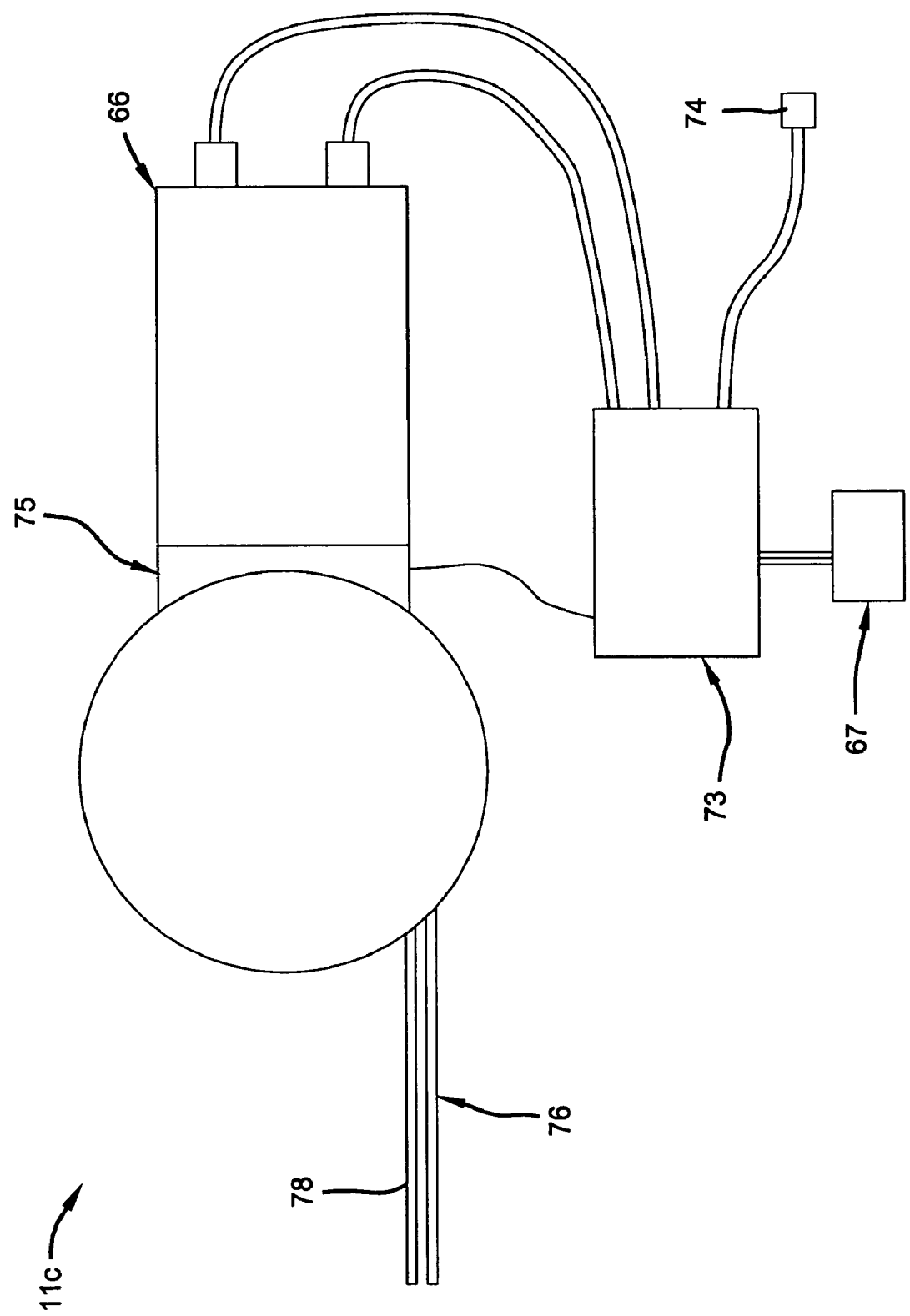
FIG. 11 is a side view of a fourth actuation mechanism in accordance with the principles of the present invention.
Figure 12:
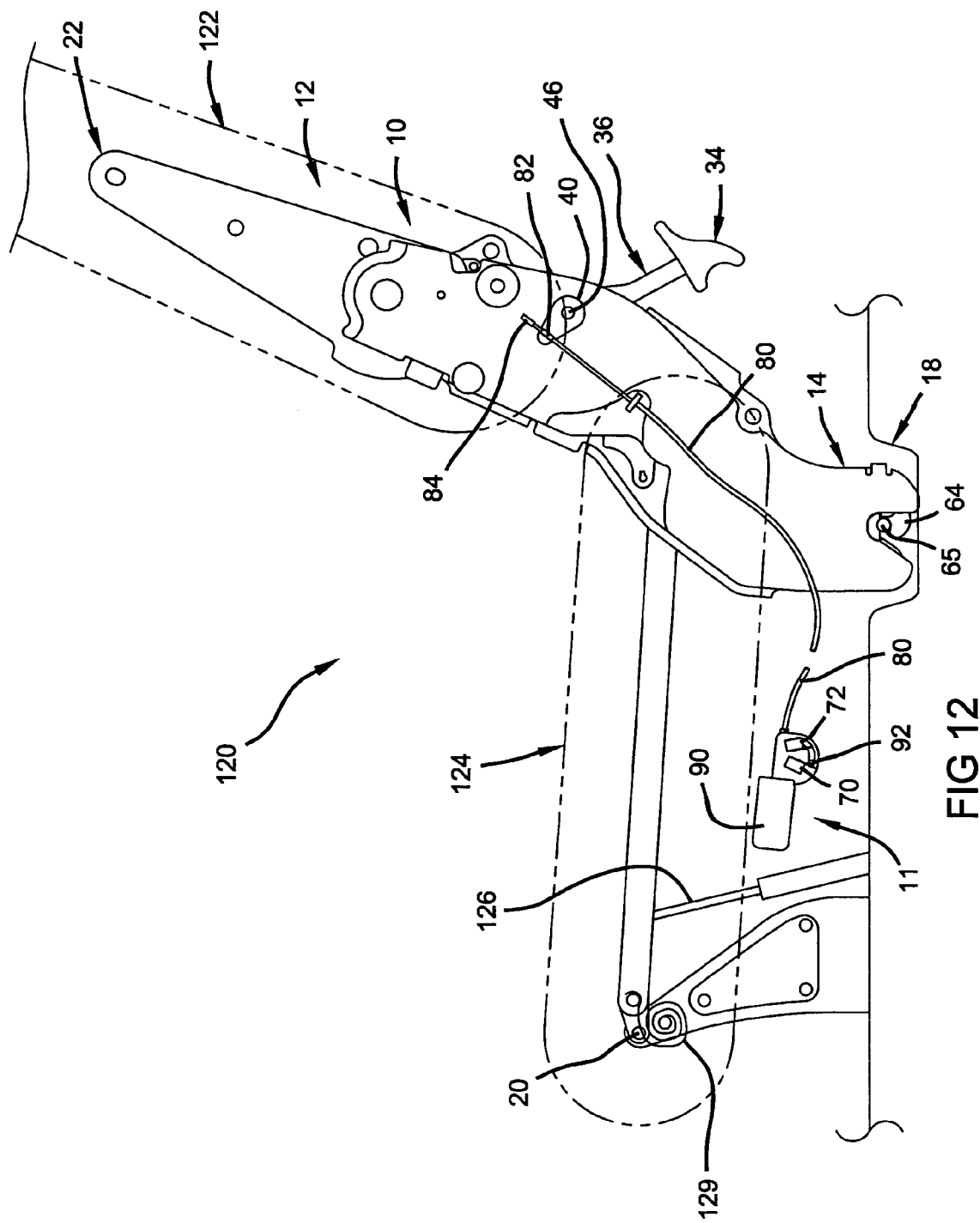
FIG. 12 is a side view of the seat adjustment mechanism incorporated into a seat assembly.

With particular reference to FIG. 11, a fourth embodiment of the powered remote actuation device 11c is shown having a DC motor 66 driven by an external power source 67, a hall-effect sensor 75, a controller 73, an actuation button 74, and a cable assembly 76.

In general, the powered remote actuation device 11c is substantially similar to the powered remote actuation device 11b described above. In view of the substantial similarity in structure and function of the components associated with the powered remote actuation device 11b and the powered remote actuation device 11c, like reference numerals are used here and in the drawings to identify like components.

The hall-effect sensor 75 of the powered remote actuation device 11c is used in place of the potentiometer 71 of device 11b and serves to provide the controller 73 with positional information relating to the cable 78. The hall-effect sensor 75 may be mounted generally within the motor 66 and functions to count pulses, or rotations, of the motor output shaft. As previously discussed, the motor output shaft drives the cable 78. Therefore, the number of rotations of the output shaft directly correlates to the cable stroke (i.e., distance or cable travel).

The controller 73 monitors signals from the hall-effect sensor 75 to track the position of the cable 78 and, thus, the status of the recliner and floor-latch mechanism 12, 14. Each cable position correlates to a distinct number of motor rotations. Therefore, the controller 73 can easily monitor cable position, based on the number of motor rotations, as measured by the hall-effect sensor 75.

The controller 73 may be programmed to power the motor 66 until a predetermined count (i.e., number of motor rotations) is received from the sensor 75 to provide a desired position of the recliner or floor-latch mechanism 12, 14. For example, the controller 73 may be programmed to cut power to the motor 66 when the cable 78 initially releases the recliner mechanism 12 prior to releasing the floor-latch mechanism 14. At this point, only the recliner mechanism 12 is released, and the controller 73 will wait for a second input prior to energizing the motor 66. Once a second input is received by the controller 73, such as depression of the actuation button 74, the controller 73 will supply power to the motor 66 once again.

The motor 66 will exert a force on the cable 78 until the controller 73 receives a pre-determined count from the sensor 75. The predetermined count signal correlates to a predetermined number of revolutions of the motor output shaft required to sufficiently pull the cable 78 and release the floor-latch mechanisms 14. In this manner, the controller 73, in combination with the hall-effect sensor 75, provides the powered remote actuation device 11c with the ability to selectively release each of the mechanisms 12, 14, 16 individually, or any combination thereof.

With particular reference to FIGS. 12-17, the seat adjustment mechanism is shown incorporated into a seat assembly 120. The seat assembly 120 includes a seatback 122 rotatably supported by a seat bottom 124 and a strut 126 for facilitating dumping or articulating of the seat assembly 120 about forward pivot 20. The strut 126 is a gas strut providing a biasing force for assistance in articulating the seat assembly 120 into a dumped or tumbled position. The strut 126, either in combination with a spring 129, or alone, allows for one-touch operation of the seat assembly 120 into the dumped position by articulating the seat 120 once the floor-latch mechanisms 14 are released. The seat assembly is preferably of the type as disclosed in U.S. patent application Ser. No. 10/288,246, filed on Nov. 5, 2002 and U.S. patent application Ser. No. 10/686,049, filed on Oct. 15, 2003, which claims priority to U.S. Provisional Patent Application No. 60/507,390, filed on Sep. 30, 2003, the disclosures of which are incorporated herein by reference.

A force is applied to the actuation button 74 to depress the actuation button 74 and close the circuit between the motor 66 and the power source 67. The power source 67 causes the motor 66, via relay 68, to rotate and impart a tensile force on the actuation handle 36. Sufficient rotation of the actuation handle 36 causes the pawl 52 to disengage the seatback support 22, as previously discussed.

Figure 13:
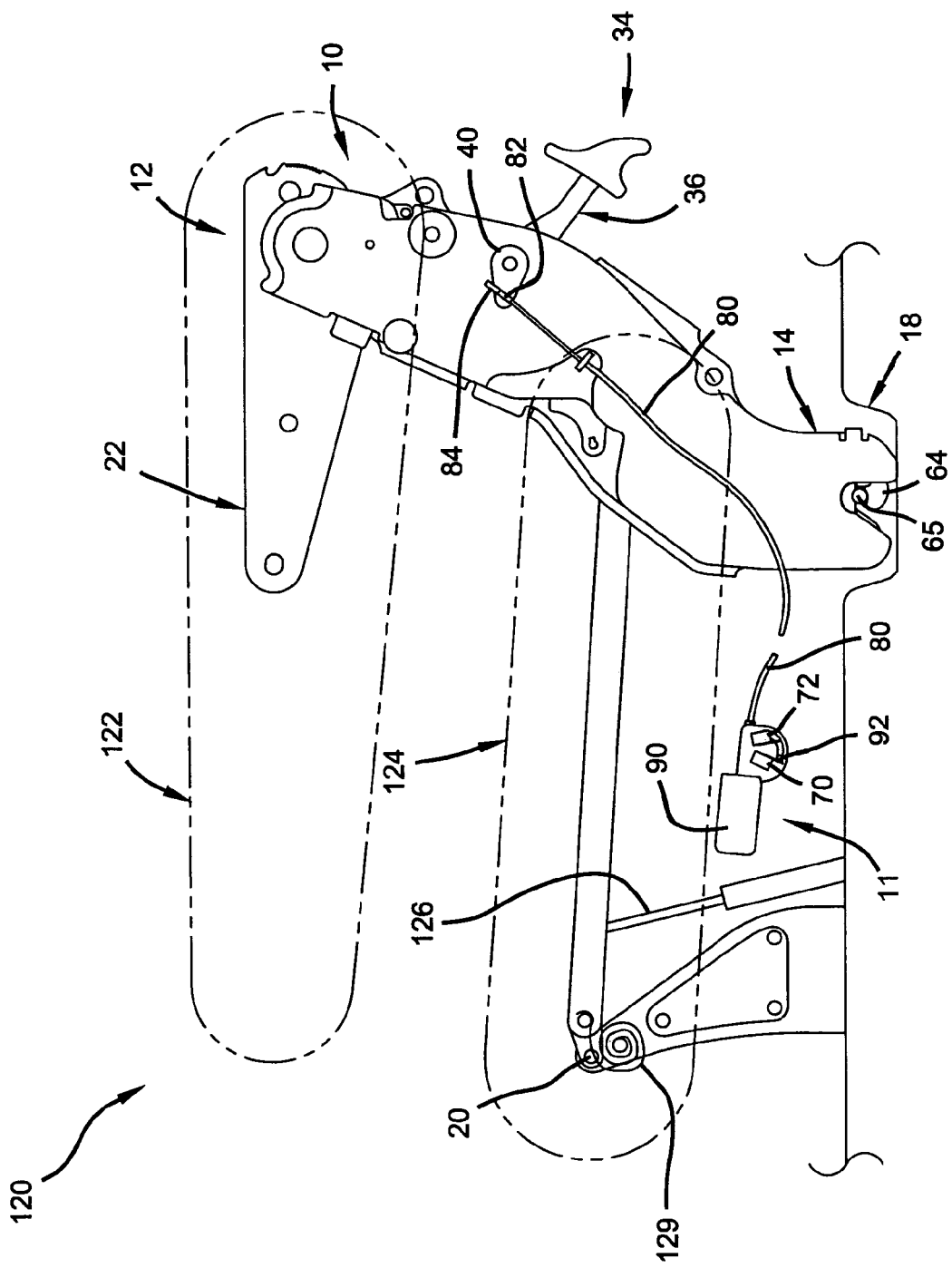
FIG. 13 is a side view of the seat assembly of FIG. 12 in a folded-flat position.
Figure 14:
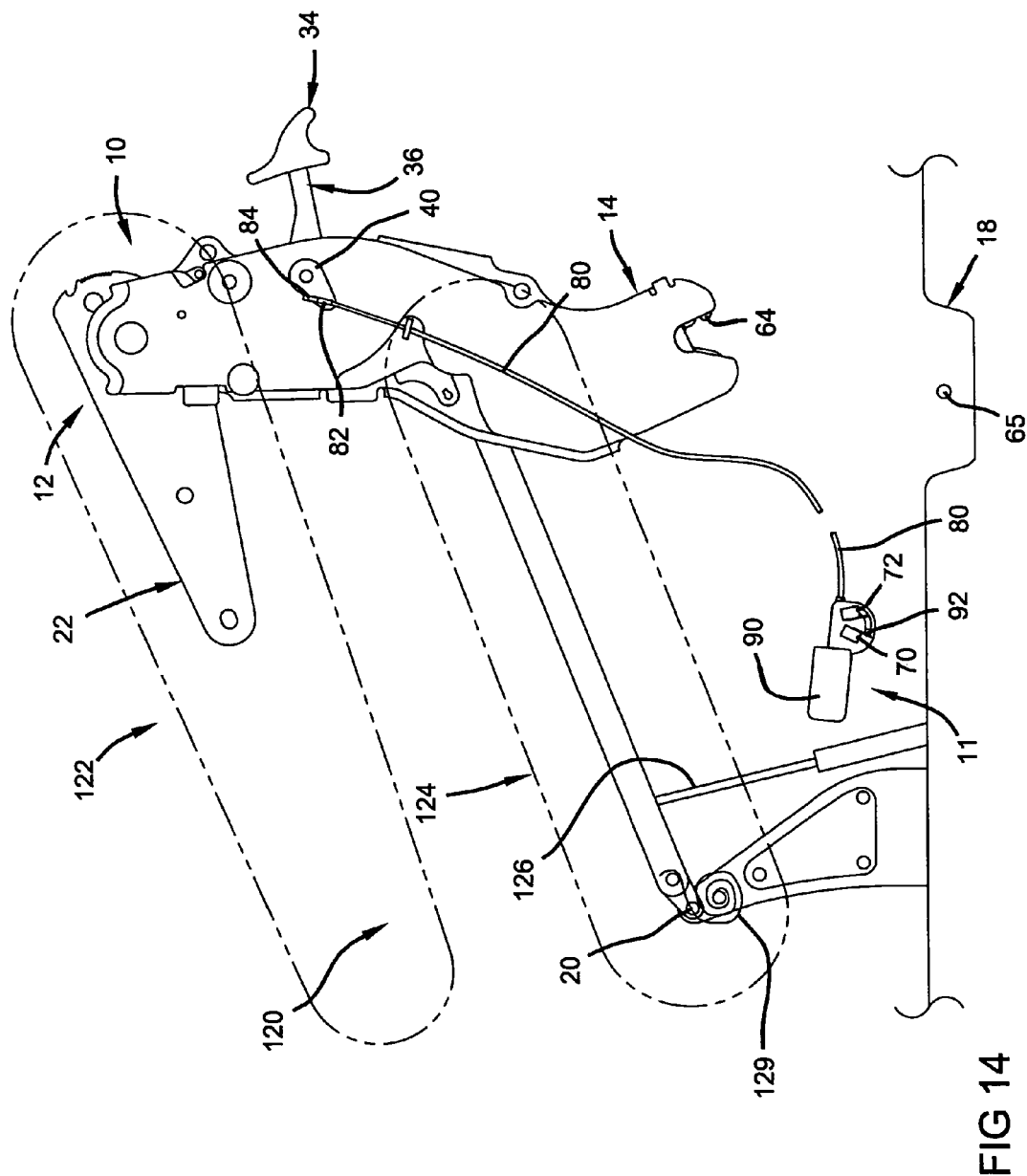
FIG. 14 is a side view of the seat assembly of FIG. 12 in a folded-flat and dumped position.

Once the seatback support 22 is disengaged from the pawl 52, the seatback support 22 is biased by coil spring 26 and rotates into the position shown in FIG. 13. At this point, the motor 66 is still exerting a tensile force on the lever 40 via cable 78 such that the actuation handle 36 engages the link 54. Further rotation of the actuation handle 36 causes rotation of the link 54, thereby releasing the floor-latch mechanism 14 and allowing the strut 126 to dump the seat assembly 120 into the dumped position, as shown in FIG. 14.

At this point, the recliner mechanism 12 and floor-latch mechanism 14 are in the unlocked position, and further tension on cable 78 is unnecessary. Therefore, the length of slot 94 and the relative position of the limit switches 70, 72 are designed such that as the mechanisms 12, 14 are released (i.e., into the unlocked position) the post 92 contacts the second limit switch 72 and causes the motor 66 to rotate in the opposite direction, as previously discussed.

As the motor 66 rotates in the opposite direction, the cable 78 is slacked, and the actuation handle 36 rotates back into the locked position. The motor 66 will continue to rotate in this fashion until the post 92 contacts the first limit switch 70. Once the post 92 contacts the first limit switch 70, power to the motor 66 is restricted and the motor 66 is shutdown.

To return the seat assembly 120 to a usable position, a force is applied to the seat assembly 120 to rotate the seat assembly 120 about forward pivot 20. As can be appreciated, as the seat assembly 120 is rotated about the forward pivot 20, the claw 64 of the floor-latch mechanism 14 approaches the striker 65. The claw 64 will rotate back into the locked position upon contact with the striker 65, thereby fixing the seat assembly 120 to the floor pan 18 once again.

At this point, the seatback 122 may be returned to an upright and usable position by first applying a force to the actuation handle 36 to disengage the pawl 52 from engagement with the seatback support 22. Once the pawl 52 is disengaged from the seatback support 22, the seatback 122 may be rotated against the bias of spring 26. Once the seatback 122 is rotated into a desired angular position relative to the seat bottom 124, the force applied to the actuation handle 36 is released and the pawl 52 once again engages the seatback support 22 to hold the seatback 122 in the desired position.

It should be noted that while a single recliner mechanism 12 and single floor-latch mechanism 14 have been described, that such mechanisms usually are incorporated into a seat design in pairs. Specifically, a typical recliner system will incorporate a control recliner mechanism and a slave recliner mechanism, whereby the control recliner mechanism dictates the position of the slave recliner mechanism. Such systems typically employ a cross-rod (not shown) linking the two mechanisms such that the position of the control mechanism may be adequately conveyed to the slave mechanism. As can be appreciated, a similar relationship typically exists for pairs of floor-latch mechanisms and pairs of kneel mechanisms if incorporated into the seat assembly 120.

Figure 15:
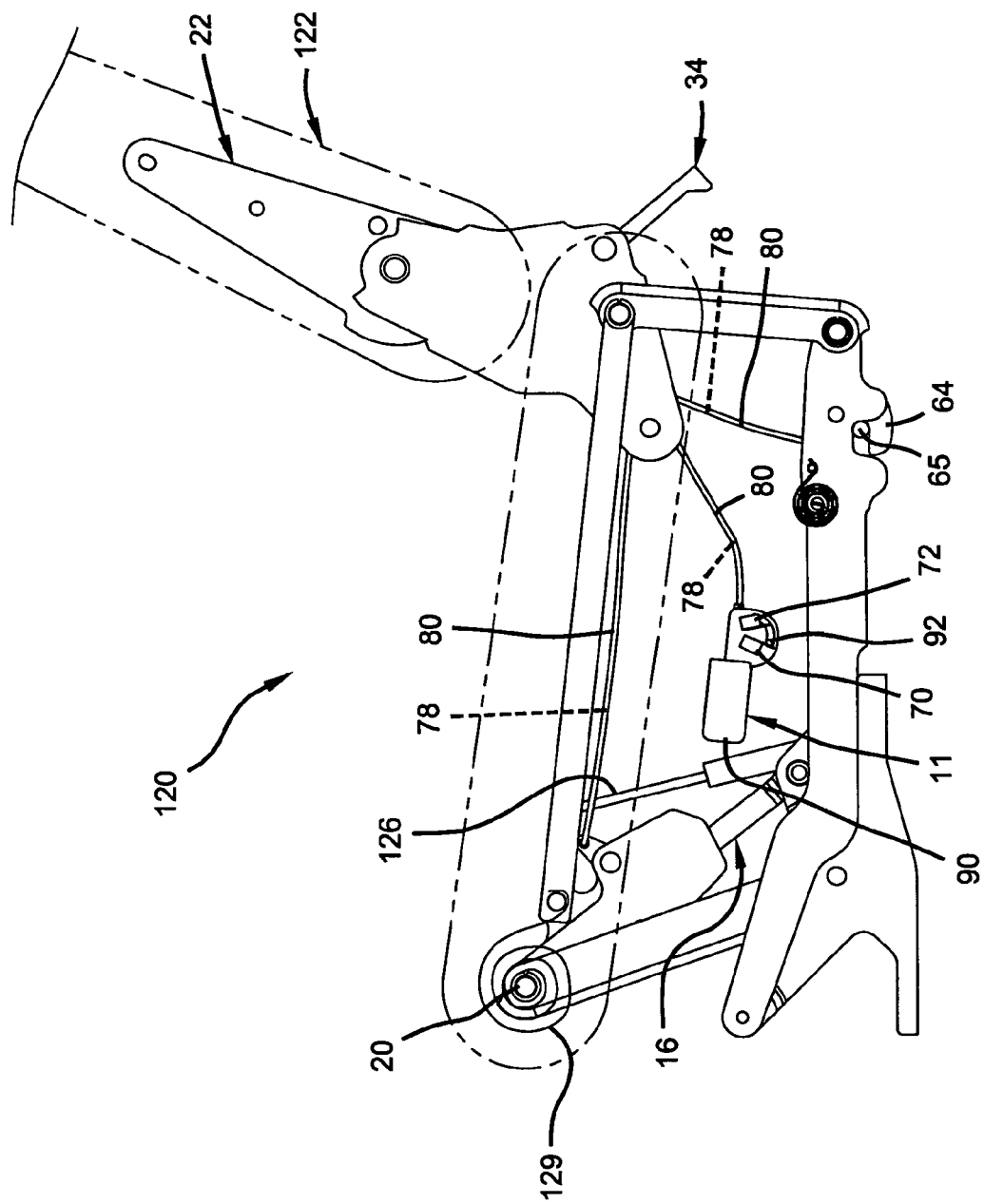
FIG. 15 is a side view of a second seat adjustment mechanism incorporated into a second seat assembly having a kneel mechanism.

With reference to FIGS. 15-17, the seat assembly 120 is shown incorporating the kneel mechanism 16. The kneel mechanism 16 may be directly connected to a powered remote actuation device 11 or may be manually operable. In either event, the kneel mechanism 16 functions to selectively permit articulation of the seat assembly 120 and is disposed generally between a mounting bracket 125 and a seat bottom support 127, as best shown in FIGS. 15 and 16. The kneel mechanism 16 selectively ties the seat bottom support 127 to the bottom bracket 125 to restrict rotation of the seat 120 relative to the bracket 125 and is positionable between a locked position and an unlocked position.

In the locked position, articulation of the seat assembly 120 is restricted due to the interaction between the kneel mechanism 16, bracket 125, and seat bottom support 127. The powered remote actuation device 11 functions to toggle the kneel mechanism 16 into the unlocked position. Specifically, the powered remote actuation device 11 selectively applies a force to the kneel mechanism 16 via cable 78 to thereby unlock the mechanism 16. Once in the unlocked position, the seat assembly 120 is permitted to articulate forward.

As previously discussed, the design and use of the powered remote actuation device 11 will vary depending on the application and the needs of the particular seating system. Any combination of the recliner, floor-latch, or kneel mechanisms 12, 14, 16 may be used in conjunction with a powered remote actuation device 11 or may be designed such that a single powered remote actuation device 11 operates all three mechanisms 12, 14, 16. For example, FIG. 15 depicts a single powered remote actuation device 11 operable to actuate each of the individual mechanisms 12, 14, 16 while FIG. 16 depicts multiple powered remote actuation devices 11 with an individual device 11 tied to and individual mechanism 12, 14, 16. For either version, operation is similar and is shown in FIG. 17 for multiple powered actuation devices 11. Because the operation of the powered remote actuation device 11 does not change with the particular mechanism to which it may be tied, a detailed description of other possible combinations of the recliner, floor-latch, and kneel mechanisms 12, 14, 16 is foregone.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mechanism for a vehicle seat including a seat bottom supported by the vehicle and a seatback coupled to the seat bottom, said mechanism comprising:
    a first adjustment mechanism having a first function, connected to the vehicle seat and operable between a locked position and an unlocked position;
    a second adjustment mechanism having a second function different than said first function, connected to the vehicle seat and operable between a locked position and an unlocked position; and
    a powered remote activation device coupled to said first adjustment mechanism and said second adjustment mechanism, said powered remote actuation device operable to toggle said first adjustment mechanism into said unlocked position prior to toggling said second adjustment mechanism into said unlocked position.

2. The mechanism of claim 1, wherein said second adjustment mechanism is a floor-latch mechanism.

3. The mechanism of claim 1, wherein said first adjustment mechanism is a recliner mechanism connected between the seatback and seat bottom of the vehicle seat.

4. The mechanism of claim 3, wherein said second adjustment mechanism is connected between the vehicle and the vehicle seat.

5. The mechanism of claim 4, wherein said second adjustment mechanism includes a combination floor-latch and kneel mechanism.

6. The mechanism of claim 1, wherein said first adjustment mechanism and said second adjustment mechanism are a combination floor-latch and recliner mechanism.

7. The mechanism of claim 1, wherein said powered remote activation device is operative to toggle said first adjustment mechanism into said locked position after said first adjustment mechanism is toggled into said unlocked position.

8. The mechanism of claim 1, wherein said powered remote activation device includes a motor and a transmission element.

9. The mechanism of claim 1, wherein the first adjustment mechanism is manually operable.

10. A seat adjustment mechanism for a vehicle seat including a seat bottom supported by the vehicle and a seatback coupled to the seat bottom, said mechanism comprising:
    a latch mechanism connected to the vehicle seat, said latch mechanism having latched and unlatched positions and operable to allow the seat bottom to pivot relative the vehicle when said latch mechanism is in said unlatched position;
    a manually operable recliner mechanism coupled to the seat bottom and seatback, said recliner mechanism having latched and unlatched positions and operable to allow rotation of the seatback relative to the seat bottom when said recliner mechanism is in said unlatched position; and
    a powered remote activation device coupled to at least one of said latch mechanism and said recliner mechanism, said powered remote activation device operable to toggle said recliner mechanism into said unlatched position prior to toggling said latch mechanism into said unlatched state.

11. The seat adjustment mechanism of claim 10, further including biasing elements operable to assist in pivoting the seatback relative to the seat bottom and the seat bottom relative to the vehicle.

12. The seat adjustment mechanism of claim 10, wherein said powered remote activation device is operable to toggle said latch mechanism into said unlatched position a predetermined period of time after said recliner mechanism is toggled into said unlatched position.

13. The seat adjustment mechanism of claim 12, wherein said powered remote activation device is further operable to toggle both of said latch mechanism and said recliner mechanism into their respective latched positions after said latch mechanism and said recliner mechanism are toggled into their respective unlatched positions.

14. The seat adjustment mechanism of claim 13, wherein said powered remote activation device toggles said recliner mechanism and said latch mechanism into their respective unlatched positions by operating said motor in a first rotational direction and toggles said recliner mechanism and said latch mechanism into their respective latched positions by operating said motor in a second opposite rotational direction.

15. The seat adjustment mechanism of claim 10, wherein said powered remote activation device includes a motor and a transmission element.

16. A mechanism for a vehicle seat having a seat bottom supported by the vehicle and a seatback pivotably connected to the seat bottom, comprising:
a first adjustment mechanism having locked and unlocked states and being connected to the vehicle seat to enable movement of the vehicle seat between a first position and a second position, said first adjustment mechanism including a first release mechanism having a release position and a non-release position and operable when actuated to said release position to transfer said first adjustment mechanism from said locked state when the vehicle seat is in said first position to said unlocked state wherein the vehicle seat is free to move between said first and second positions;
a second adjustment mechanism connected between the vehicle seat bottom and the vehicle to enable the vehicle seat bottom to move from a first orientation wherein the seat bottom is substantially horizontal to a second orientation wherein the seat bottom is substantially vertical, said second adjustment mechanism having a locked state and an unlocked state and having a second release mechanism with a release position and a non-release position for transferring said second adjustment mechanism between said locked and unlocked states; and
a powered remote activation assembly comprising a motor, a first transmission device connected between said motor and said first release mechanism, and a second transmission device connected between said motor and said second release mechanism, said powered remote activation assembly being adapted to actuate said first release mechanism to its release position and unlock said first adjustment mechanism when the motor is operated in a first rotational direction to thereby permit movement of said vehicle seat from said first position to said second position and to actuate said second release mechanism to its release position to unlock said second adjustment mechanism after actuation of said first release mechanism to its release position.

17. The mechanism of claim 16, wherein said powered remote activation assembly is adapted to return said first release mechanism to its non-release position a predetermined period of time after actuation of said first release mechanism to its release position.

18. The mechanism of claim 17, wherein said motor is operable in a second opposite rotational direction and further wherein said first release mechanism is returned to its non-release position by operating said motor in said second rotational direction.

19. The mechanism of claim 17, wherein said first transmission device comprises a cable connected at one end to said motor and at its other end to said first release mechanism.

20. The mechanism of claim 17, wherein said first adjustment mechanism is manually operable and connected between the seatback and seat bottom of the vehicle seat for permitting rotation of said seatback relative to said seat bottom, and further wherein said first position of said vehicle seat corresponds to said seatback in a substantially upright position and said second position of said vehicle seat corresponds to said seatback in a folded position.

21. The mechanism of claim 20, wherein said first adjustment mechanism includes biasing means for biasing said seatback toward said folded position.

22. The mechanism of claim 16, wherein said second transmission device is connected between said first release mechanism and said second release mechanism.

23. The mechanism of claim 22, wherein said first release mechanism includes a rotatable handle member and further wherein rotation of said handle member to a first position actuates said first release mechanism to its release position to unlock said first adjustment mechanism and further rotation of said handle member to a second position actuates said second release mechanism to its release position to unlock said second adjustment mechanism.

24. The mechanism of claim 23, wherein said first transmission device comprises a cable connected at one end to said motor and at its other end to said first release mechanism.

25. The mechanism of claim 24, wherein said second transmission device comprises a link connected to said handle member and to said second release mechanism.

26. The mechanism of claim 16, wherein said second release mechanism is returned to its non-release position and thereby enables said second adjustment mechanism to transfer back to said locked state when said vehicle seat bottom is returned to said first orientation.

27. The mechanism of claim 26, wherein said powered remote activation assembly is further adapted to return said second release mechanism to its non-release position a second predetermined period of time after actuation of said second release mechanism to its release position.

28. The mechanism of claim 27, wherein said motor is operable in a second opposite rotational direction and further wherein said second release mechanism is returned to its non-release position by operating said motor in said second rotational direction.

29. The mechanism of claim 16, wherein said second adjustment mechanism includes biasing means for biasing said vehicle seat bottom toward said second orientation.

30. The mechanism of claim 16, wherein said powered remote activation assembly returns said first release mechanism to its non-release position and enables said first adjustment mechanism to transfer back to said locked state when the vehicle seat is returned to said first position.

* * * * *